United States Patent [19]

Levecque et al.

[11] 4,102,662

[45] Jul. 25, 1978

[54] METHOD AND APPARATUS FOR MAKING FIBERS FROM THERMOPLASTIC MATERIALS

[75] Inventors: Marcel Levecque, Birchrunville, Pa.; Jean A. Battigelli; Dominique Plantard, both of Rantigny, France

[73] Assignee: Saint-Gobain Industries, Neuilly-sur-Seine, France

[21] Appl. No.: 762,789

[22] Filed: Jan. 25, 1977

Related U.S. Application Data

[63] Continuation-in-part of Ser. No. 676,755, Apr. 14, 1976, and Ser. No. 557,282, Mar. 11, 1975, Pat. No. 4,015,964, said Ser. No. 676,755, continuation-in-part of Ser. No. 557,282, is a continuation-in-part of Ser. No. 353,984, Apr. 24, 1973, Pat. No. 3,885,940.

[30] Foreign Application Priority Data

Dec. 16, 1976 [FR] France .............................. 76 37884

[51] Int. Cl.² ............................................. C03B 37/06
[52] U.S. Cl. ............................................. 65/5; 65/16; 264/12; 264/176 F; 425/7
[58] Field of Search .............................. 65/5–8, 65/14–16; 264/5, 12, 176 F; 425/7

[56] References Cited

U.S. PATENT DOCUMENTS

| | | | |
|---|---|---|---|
| 328,226 | 10/1885 | Kennedy et al. .......................... | 65/5 |
| 3,357,808 | 12/1967 | Eberle ................................... | 65/16 X |
| 3,874,886 | 4/1975 | Levecque et al. ......................... | 65/5 |
| 3,885,940 | 5/1975 | Levecque et al. ......................... | 65/5 |

FOREIGN PATENT DOCUMENTS

| | | | |
|---|---|---|---|
| 1,177,874 | 4/1959 | France ..................................... | 65/5 |
| 167,228 | 5/1951 | Sweden .................................... | 65/5 |

*Primary Examiner*—Robert L. Lindsay, Jr.
*Attorney, Agent, or Firm*—John T. Synnestvedt

[57] ABSTRACT

Method and apparatus for the production of fibrous materials from attenuable substances, particularly molten glass, are disclosed, along with the fiber products which result. In the disclosed system the material to be fiberized flows into a region established as a result of the interaction of a jet transversely oriented with respect to a larger blast, the material being acted upon in the interaction zone to produce a highly attenuated fiber. Method and apparatus are disclosed utilizing a glass admission orifice and jet blast generating devices which are spaced from each other. Moreover, method and equipment are disclosed for forming fibers from attenuable material by the use of high velocity whirling gas currents or tornadoes. Attenuation is preferably effected in two sequential stages, each of which utilizes a pair of high velocity whirling currents or tornadoes, with the gases in the two tornadoes of each pair turning in opposite directions.

42 Claims, 19 Drawing Figures

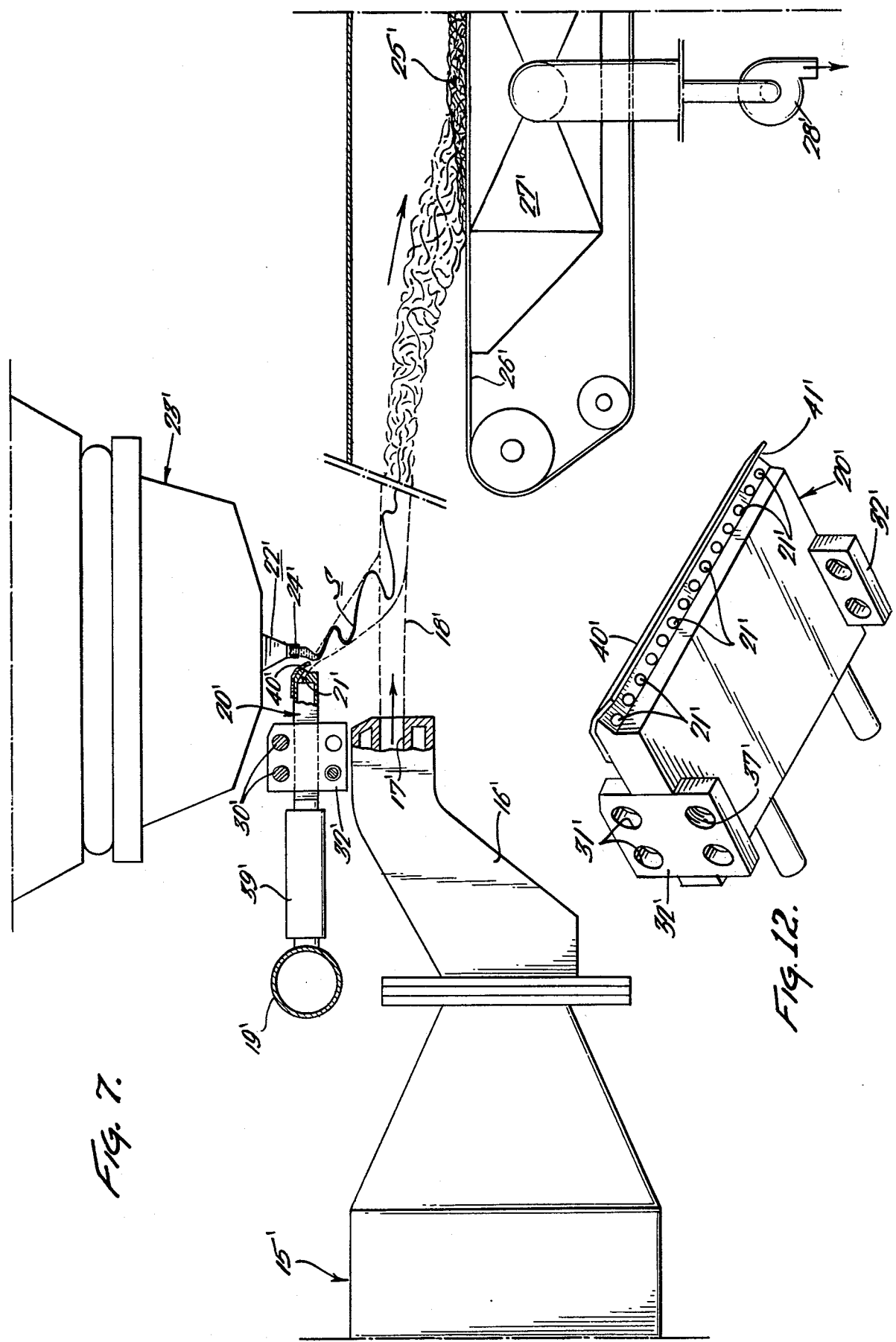

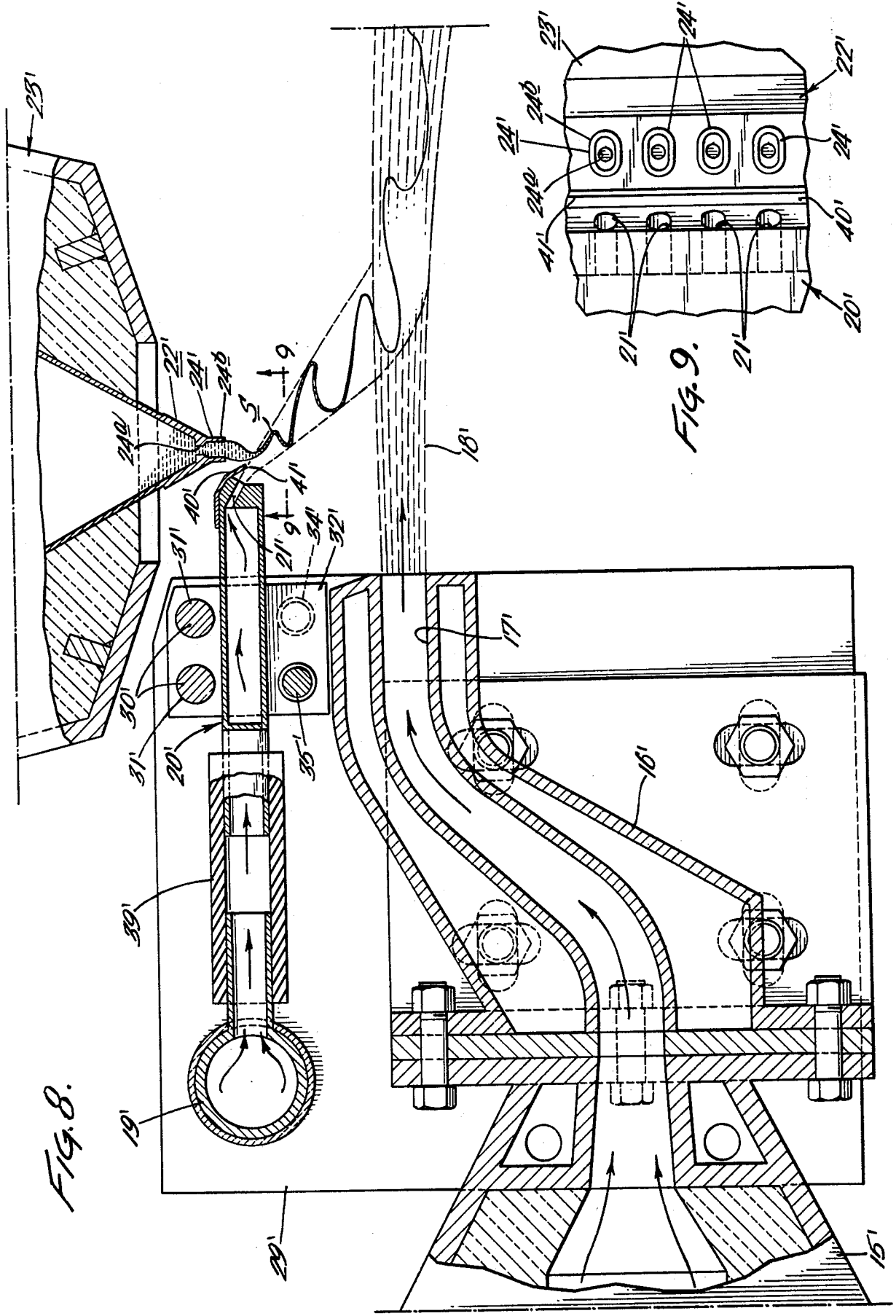

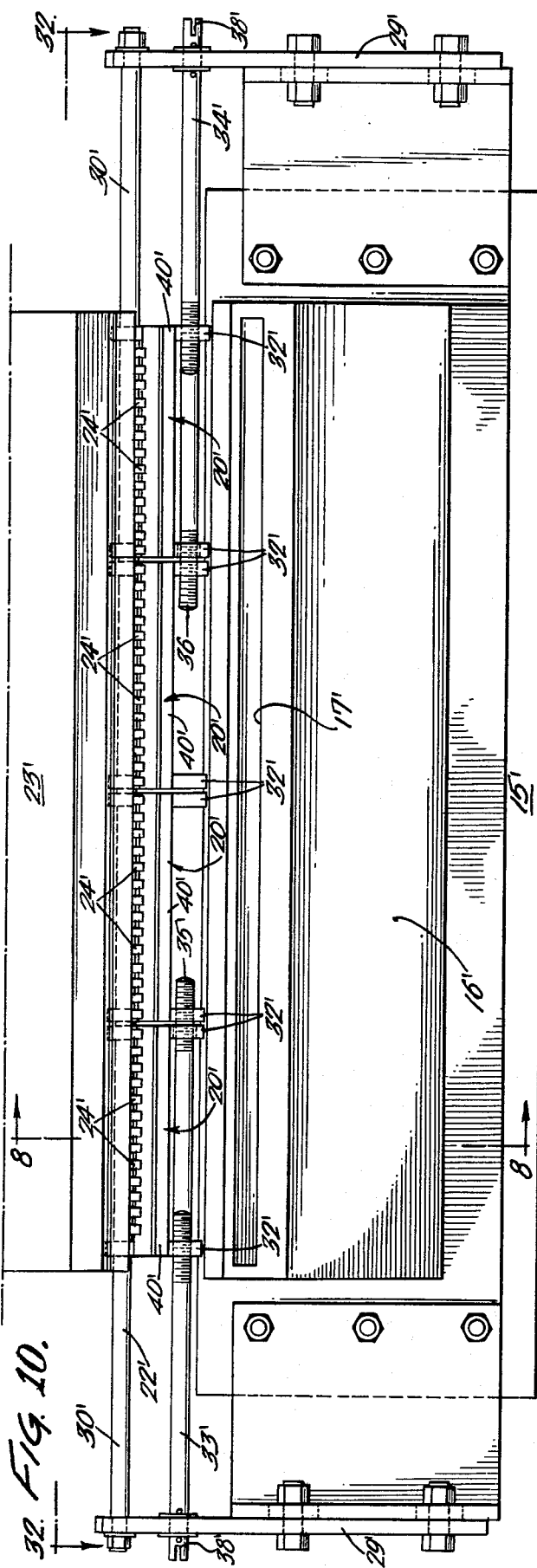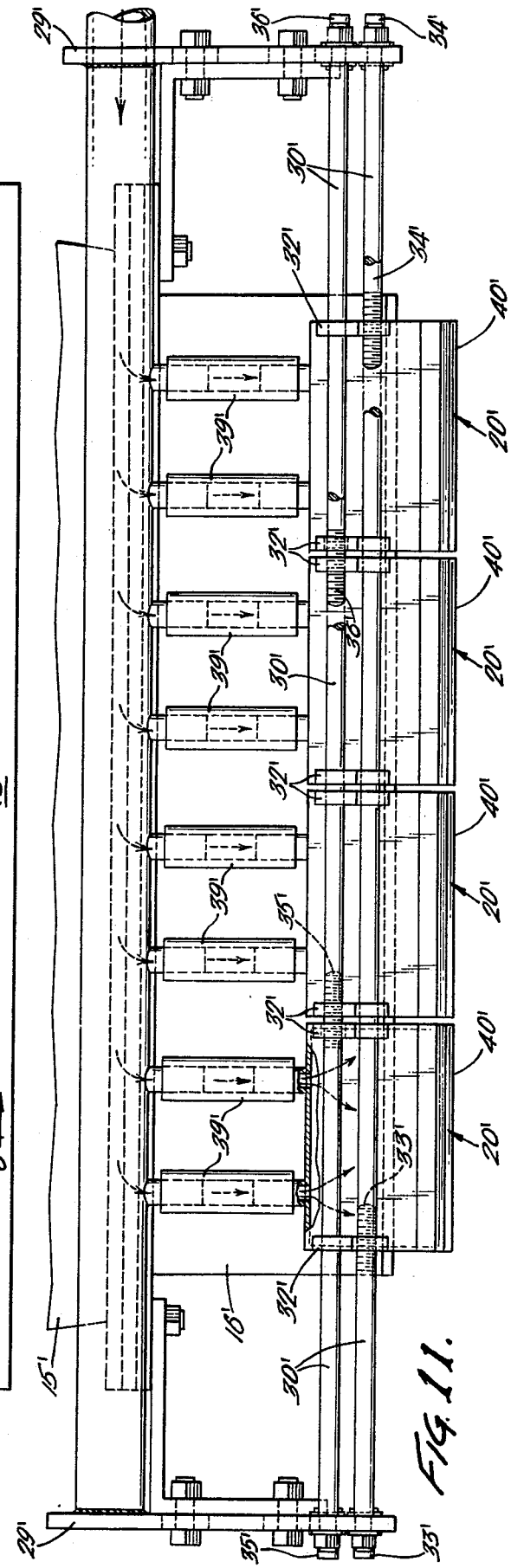

METHOD AND APPARATUS FOR MAKING FIBERS FROM THERMOPLASTIC MATERIALS

CROSS REFERENCES

The present application is a continuation-in-part of our application Ser. No. 676,755, filed Apr. 14, 1976 and also of our application Ser. No. 557,282, filed Mar. 11, 1975, now U.S. Pat. No. 4,015,964. Said application Ser. No. 676,755 is also a continuation-in-part of said application Ser. No. 557,282, which in turn is a continuation-in-part of our application Ser. No. 353,984, filed Apr. 24, 1973 and issued May 27, 1975 as U.S. Pat. No. 3,885,940.

Attention is also called to the fact that said prior application Ser. No. 353,984 and also the present application discloses certain subject matter in common with application Ser. No. 353,983, filed Apr. 24, 1973, by two of the present applicants, and issued Apr. 1, 1975 as U.S. Pat. No. 3,874,886. The omission of claims directed to any features herein disclosed is not to be understood as an abandonment of that subject matter, because such features are claimed in companion applications.

TABLE OF CONTENTS

In connection with the following listing of the headings and in connection with the text of the specification between the headings as inserted in the specification, it is to be understood that not all of the text which intervenes between successive headings is necessarily directly related to the subject of the preceding heading, because in many instances interrelated subjects are jointly considered or are considered in overlapping sequence.

ABSTRACT
CROSS REFERENCES
TABLE OF CONTENTS
INTRODUCTION
BACKGROUND
STATEMENT OF THE PRIOR ART
    1. Longitudinal Blowing
    2. Strand
    3. Aerocor
    4. Centrifuging
ANALYSIS OF THE PRIOR ART
BIBLIOGRAPHY OF PRIOR PATENTS
OBJECTS AND ADVANTAGES
BRIEF DESCRIPTION OF DRAWINGS
BRIEF DESCRIPTION OF TORATION
FIG. 1
GENERAL STATEMENT OF VARIABLES
ANALYSIS OF TORATION — FIG. 5
JET INTERACTION ACTIVITY
ACTION ON GLASS
FIG. 3
FIG. 4
FIG. 5
FIG. 6
FIGS. 7–17B

INTRODUCTION

The invention relates to fine fibers and to the production thereof from a substance in a condition in which it is capable of being attenuated, such substances being hereafter generally referred to as "attenuable materials", particularly attenuable materials which soften or liquefy upon entering a molten state as a result of the application of heat and which harden, or become relatively solid, upon cooling.

The process and equipment of the invention are especially suited to the formation of fibers from glass and the disclosure herein accordingly emphasizes glass fibers and their production.

BACKGROUND

There are four rather well-defined and recognized prior art techniques by which glass fibers can be made, these four techniques, which are mentioned at this point but discussed in more detail herebelow, being:
1. Longitudinal Blowing: Other terms sometimes used include "blown fiber", "steam blown wool", "steam blown bonded mat", "low pressure air blowing", or "lengthwise jets".
2. Strand: Other terms sometimes used are "continuous filament", or "textile fibers".
3. Aerocor: Another term sometimes used is "flame attenuation".
4. Centrifuging: Other terms sometimes used include "rotary process", "centrifugal process", "tel process", or "supertel process".

There are numerous variants of each of the above four processes, and some efforts in the art to combine certain of the processes. Further, there are other techniques discussed in the prior art by which prior workers have attempted to make glass fibers. However, the variants, attempted combinations, and attempted other techniques have not met with sufficient success to achieve a separate and recognizable status in the art.

The present application and the companion applications Ser. Nos. 676,755, 557,282, 353,983 and 353,984, above referred to are all concerned with a new, fifth technique which is unique in principle and practice, and which brings about unique results, and therefore is the starting point of a new art. Since the inventions of both the present and the companion applications are closely related, a full disclosure of the common subject matter of the present application and of the prior applications is included in the present application. Moreover, in the description of various embodiments of the common subject matter, unless otherwise indicated by statement or context, the references to "the invention" are not to be understood as limited to inventive subject matter of either the present application alone or of either of the companion applications alone.

Because the subject matter concerns a new technique, and also because a diligent search has failed to reveal any suitable existing English word which aptly applies to the new technique disclosed, we have coined the word "torate", a verb, and the word "toration", a noun, to refer to our new technique and product. The usage of these new words in the present specification will illuminate their meanings, but for present purposes it is pointed out that, by our new technique, glass can be "torated" into fibers, the jet and blast which cooperate to effect fiberization can be referred to as the "torating" current or blast, the fibers which result can be said to have been "torated", or to be "torated" fibers, and the process involved can be referred to as "toration".

STATEMENT OF THE PRIOR ART

Attention is now turned to a more detailed survey of the four prior art techniques briefly mentioned above. The numbers appearing within parentheses in the text below refer to prior art references fully indentified in the bibliography set forth at the end of this section.

1. Longitudinal Blowing

Longitudinal blowing (items 1, 2, 3 and 4 of the bibliography herebelow) is a glass fiber manufacturing process according to which melted glass flows from the forehearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

There are two longitudinal blowing techniques. In the first technique the attenuating blasts engage already drawn fibers and the product resulting is typically a mat, commonly known as "steam blown bonded mat", suitable for reinforcement. In the second longitudinal blowing technique the attenuating blasts strike directly on larger streams of molten glass and the product resulting is typically an insulation wool commonly known as "steam blown wool".

In a variation (item 5) of the first longitudinal blowing technique, the entire bushing structure and associated furnace are enclosed within a pressure chamber so that, as the streams of glass emerge from the pressure chamber through a slot positioned directly beneath the glass emitting tips of the bushing, this variation being commonly referred to as "low pressure air blowing", and products being commonly known as "low pressure air blown bonded mat and staple yarn".

2. Strand

The strand glass fiber manufacturing process (items 6 and 7) begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes. The prior art patents in the field of the strand process are far too numerous to mention and are of no real significance to the present invention. Therefore, it is considered sufficient that the references above are illustrated of the strand process.

3. Aerocor

In the aerocor process (items 8 and 9) for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. Centrifuging

In the centrifuging glass fiber manufacturing process (items 10 and 11), molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downward blast, which latter is generally high pressure air or steam. The glass streams are thereby attenuated into fine fibers which are cooled and discharged downwardly in the form of glass wool.

ANALYSIS OF THE PRIOR ART

It has long been recognized that it is desirable to produce glass fibers exceedingly small in diameter, for example on the order of a few microns, because products made with such fine fibers have remarkable advantages, including strength, good thermal insulating capability and other physical properties. Further, while the length of the fiber is more or less significant according to the purpose for which the fiber is to be used, it is generally desirable that the fibers be long rather than short. Still further, it is highly advantageous, particularly from the standpoint of the economics of fiber production, that a high production rate be utilized in the manufacturing process employed. One way to reach a high production rate is to have a high orifice pull rate. By "orifice pull rate" we mean to denote the amount of production accomplished within a given time from a single fiber producing center. "A single fiber producing center" means one orifice emitting one glass stream in the longitudinal blowing process, the strand process, and the centrifuging process, and it means one rod of glass in the aerocor process. In toration it means one glass cone from which a single fiber is drawn. Pull rates for a given process are typically given in terms of kilograms, or pounds, or tons, per hour, or per twenty-four hour period.

To summarize, it is generally desirable to make very fine fibers, very long fibers, and to make fibers at a high orifice pull rate, but these objectives conflict with each other, insofar as prior art processes are concerned. Therefore it has always been necessary that a selection be made to sacrifice one or more desiderata in order to obtain the others. Further, each of the prior art processes can effectively serve to make only one or a narrow range of products. For example, by the strand process very fine continuous fibers can be made, but the orifice pull rate is low and the resultant product is not economically useable in the form of glass wool. On the other hand, the centifuging process makes fibers at a relatively higher orifice pull rate but they tend to be short and they are produced in the form of wool and cannot be readily organized to make roving or other reinforcing products or textiles. The wool resulting from the centrifuging process is very satisfactory in products such as building insulation in which considerable ranges of fiber diameters and lengths in the finished product are satisfactory; however, where the insulation and product strength requirements are very high, other techniques of manufacture, such as the aerocor process, are generally employed.

The aerocor process makes long and fine fibers, if orifice pull rates comparable to those of the centrifuging process are used. But the aerocor process cannot be operated at an orifice pull rate high enough to effectively compete with the centrifugal process. As the orifice pull rate in the aerocor process is progressively increased, there is a corresponding increase, unavoidably, in fiber diameter, until a certain diameter is reached and if the orifice pull rate is increased even further, the glass rod utilized in the process will tend to pass through the gaseous blast without being completely melted and this results in the inclusion in the product of an unacceptably high number of bent pieces of relatively coarse glass fiber, these bent pieces being known as hooks.

In the above described first longitudinal blowing technique the fibers in the bonded mat are long and uniform in diameter, but the orifice pull rates are relatively low. An attempt to increase the orifice pull rates generates unfiberized material having the shape of insufficiently drawn glass drops.

It is the prime characteristic of the invention to obtain fine and long fibers at very high orifice pull rates.

In the second longitudinal blowing technique the orifice pull rates can be very high, but the attenuating blasts break the glass streams prior to attenuation with the result that a large portion, even up to 50%, of the glass is unfiberized and lodges in the wool product in the form of slugs; further, the fiber is very short and irregular in diameter.

It is an important characteristic of the invention to obtain the fine and long fibers at high pull rates, as discussed above, while at the same time producing fiber practically free of unfiberized material.

Many prior workers have made repeated efforts to optimize the manufacture of glass fibers by one or more of the processes which start with molten streams of glass. Various of these prior art techniques have been concerned with trying to optimize the attenuation process by extending or lengthening the attenuation zone, either by providing special means to accomplish the addition of heat to the streams of glass and to the embryonic fibers (item 12), or through the use of confining jets (items 13 and 14), or both (item 15).

The approach taken in the just mentioned prior art technique suggests that the realization of optimum fiberization lies in extending the length of the attenuating zone.

Contrary to such teachings, in the practice of the present invention, attenuation is accomplished in the course of a short path length, on the order of one to two centimeters. Therefore, as will be more readily apparent from the explanation of the subject invention which follows, it is an important characteristic of the invention that the fibers are removed, very early in the process, to a cool zone, in which no further attenuation is possible.

Various other approaches have been suggested for introducing glass in the molten state into an attenuating blast (items 16, 17, 18 and 19). In such attempts to introduce a stream of molten glass into an attenuating blast it has been noted that there often is a tendency of the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles as in Fletcher (item 16), and the transfer of substantial kinetic energy to the glass stream as, for example, by the modifications of the centrifuging process taught in Levecque (item 11), Paymal (item 18), and Battigelli (item 19).

An alternate approach to the problem, more closely akin to the aerocor process, has been the introduction of the glass in the form of a solid (item 9) or pre-softened (item 20) glass rod or in the form of powdered glass (item 14).

In contrast, it is another important characteristic of the invention to introduce glass in the molten state, in a progressive and very stable way, into an attenuating zone where the attenuating parameters are the most efficacious.

BIBLIOGRAPHY OF PRIOR U.S. PATENTS (1) Slayter et al No. 2,133,236
(2) Slayter et al No. 2,206,058
(3) Slayter et al No. 2,257,767
(4) Slayter et al No. 2,810,157
(5) Dockerty No. 2,286,903
(6) Slayter et al No. 2,729,027
(7) Day et al No. 3,269,820
(8) Stalego No. 2,489,243
(9) Stalego No. 2,754,541
(10) Levecque et al No. 2,991,507
(11) Levecque et al No. 3,215,514
(12) Stalego No. 2,687,551
(13) Stalego No. 2,699,631
(14) Karlovitz et al No. 2,925,620
(15) Karlovitz No. 2,982,991
(16) Fletcher No. 2,717,416
(17) Eberle No. 3,357,808
(18) Paymal No. 3,634,055
(19) Battigelli No. 3,649,232
(20) Stalego No. 2,607,075

OBJECTS AND ADVANTAGES

In contrast with all of the foregoing, it is a major objective of the present invention to provide a technique for producing glass fibers (as well as the resulting fibers themselves) in which it is not necessary to sacrifice any one of the major desiderata above referred to, namely, fineness of fiber, long fiber length and high pull rate.

Because of the accomplishment of the above major object, with the technique of the present invention it is possible to produce fibers adapted to a much wider range of uses than has been practicable with any one of the presently known techniques.

Another object of the invention is the provision of a technique for producing mineral fibers which is readily adaptable to adjustment of operating conditions so as to selectively produce fibers adapted to a wider variety of uses than has been practicable heretofore. The broad range of fiber types and characters capable of being produced by the technique of the present invention makes it unnecessary in many situations to rely upon more than one technique or process for various different products. In the glass fiber industry this presents outstanding advantages because of the capability of producing a wider range of products with a single technique, thereby eliminating substantial investment in capital equipment which would otherwise be required in order to produce the same range of products by presently known or conventional techniques.

The invention further has in view the provision of a technique for producing glass fibers in which various limitations of the prior art techniques are eliminated. For example, the technique of the present invention requires only static equipment, in contrast with the widely used centrifuge method in which the fiberizing equipment rotates at high speed, thus necessitating special high precision machinery and maintenance. Static equipment makes it possible to construct the equipment from materials which have very high strength at high temperatures in static conditions, without the need to have high temperature strength in dynamic conditions. This allows fiberizing a broader range of materials.

As another example of eliminating prior art limitations, the technique of the present invention greatly simplifies and facilitates the introduction of molten glass into the interior of a blast for purposes of attenuation, the means or system for accomplishing such introduction of the glass in the process of the invention being explained more fully hereinafter. This feature of the invention is in striking contrast to various of the prior art systems for introducing glass into an attenuating blast, such as the aerocor process above described, in which a solid glass rod is fed into the blast, to be softened and melted. As above pointed out this type of system is severely limited with respect to pull rate and has a tendency to develop "hooks." In contrast, the feed of the molten glass into the attenuating zone within the torating blast in the technique of the present invention makes possible much higher orifice pull rates than are possible with the aerocor process, and this is accomplished with the technique of the present invention with a negligible amount of unfiberized material and moreover, while maintaining fineness of fibers.

A still further object of the present invention is to provide a technique for making mineral fibers in which a wider variety of batch formulations may be utilized in the making of fibers, over a wide range of fiber properties or characteristics, than is possible with any one of the presently known processes.

In addition to the foregoing, the various embodiments of FIGS. 6 and 7 to 17B have further advantages incident to the separation of various components of the fiberizing centers from each other, as will be explained hereinafter in portions of this description specifically concerned with the embodiments of those Figures.

The foregoing and other objects and advantages which are attained, including numerous specific advantages flowing from toration will be explained more fully hereinafter.

THE DRAWINGS

FIG. 1 is a diagrammatic representation of the major components of one system according to the invention, showing the general interrelation of the components for producing a blast and for producing a jet transverse to the blast, as well as the glass supply means and the fiber collection device.

FIG. 2 is a diagrammatic perspective view, of the action at a fiberizing center according to said parent application and showing a pattern of flow of gases and glass which is typical of toration, this view being inverted as compared with FIG. 1, that is, showing the glass and jet flowing upwardly instead of downwardly.

FIG. 3 is a sectional view of an embodiment, in which a water cooled plate is utilized adjacent the path of the blast downstream of the fiberizing center.

FIG. 4 is a view similar to FIG. 3 but further showing the use of a water cooled deflector adjacent the side of the gas blast opposite to the fiberizing center.

FIGS. 7 to 17B illustrate an arrangement in which both the glass supply means and the jet generators are spaced from each other and in which provision is made for deflection of the jets, the several figures of this group being briefly identified as follows:

FIG. 7 is an outline overall elevational view with a few parts shown in vertical section showing the general arrangement of the major components of an equipment according to this embodiment of the present invention;

FIG. 8 is an enlarged vertical sectional view of the components provided at one of the fiberizing centers, this view being taken as indicated by the section line 8—8 on FIG. 10;

FIG. 9 is a further enlarged fragmentary inverted plan view of some of the jet and glass orifices, this view being taken as indicated by the line 9—9 on FIG. 8;

FIG. 10 is an elevational view of portions of the equipment shown in FIGS. 7 and 8 and taken from the right of FIG. 8;

FIG. 11 is a plan view taken generally as indicated by the line 11—11 applied to FIG. 10;

FIG. 12 is an enlarged perspective view of a jet manifold box employed in the equipment shown in FIGS. 7 to 11;

FIG. 13 is a perspective diagrammatic view illustrating the operation of the method and equipment according to this embodiment of the present invention;

FIG. 14 is a cross sectional fragmentary and enlarged view of the equipment viewed as in FIG. 8, and illustrating certain phases of the activity of the blast and jet in effecting attenuation of the glass being delivered from the orifice at the top of the figure;

FIG. 15 is a plan view of several jets and of portions of the blast shown in FIG. 14, but omitting the glass feed and glass fibers being formed;

FIG. 16 is a transverse diagram through portions of several adjacent jets, and illustrating directions of rotation of certain pairs of the counter-rotating tornadoes developed in this embodiment of the method and apparatus;

FIG. 17 is a fragmentary sectional view of the major components, particularly illustrating certain dimensions to be taken into account in establishing operating conditions in accordance with the preferred practice of this embodiment of the present invention;

FIG. 17B is a transverse sectional view through a portion of the delivery means for the attenuable material.

TORATION

The terms "toration," a noun, and "torate," a verb, as mentioned above and as used herein, constitute contractions of the words "tornado" and "attenuation" and are used to denote the action on an attenuable material in the zone of interaction created when a blast, or first jet, is penetrated by a transversely oriented second jet, the latter being completely encompassed or enveloped by the former. Clearly defined and forceful currents, including two counterrotating tornadoes, or whirls, or vortices, having substantial angular velocity, are generated by the interaction of the two jets, and these currents, by frictional licking or sweeping against the surface of the attenuable material, exert forces tending to induce the attenuable material to flow toward and into the zone of interaction; the material then is brought more and more under the influence of the tornadoes and forms itself into an elongated cone from the tip of which a fine fiber is drawn by the combined flows of the jets. It is surprising that, although located in a whirling zone with very high velocities, the glass cone nevertheless is stable and that its cross section reduces progressively from its base at the plane of emission to its tip, from which a single fiber starts. It is also very surprising that this fiber, although, at least part of the time, it has a nearly helicoidal movement at an increasing amplitude and velocity, continuously emanates from the cone in a continuous attenuation process.

The virtual lack of slugs in the fiber manufactured by toration is due to the dimensional and positional stability of the glass cone and to the continuity of the unique fiber attenuation.

The interaction phenomenon as described hereabove and which is of fundamental importance to the invention, can occur with a plate limiting one of the borders of the blast and through which the secondary jet is flowing. This same phenomenon can take place in embodiments, such as that of FIG. 12 described in which the plate is so small that it is virtually non-existant, or even without any plate. The interaction phenomenon is essentially the same, whether or not there is a plate. Since we prefer to employ at least some form of plate, although it may be of quite limited extent, in the following description we emphasize embodiments in which there is a plate.

FIG. 1

Figure 1:
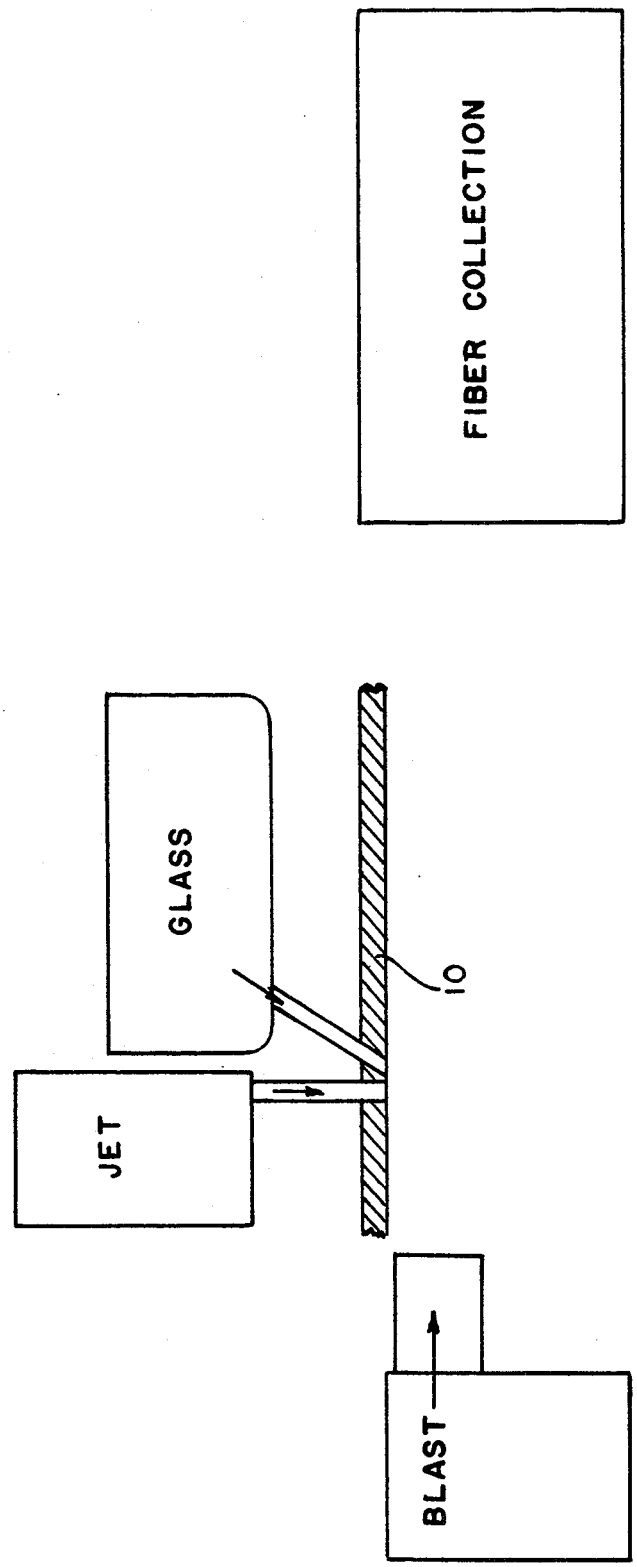
FIGS. 1 to 4 are briefly described just below, these figures also appearing in our application Ser. No. 353,984 above identified.

Referring first to FIG. 1, a blast, or primary jet source, is indicated at the left, being arranged to deliver the blast along a surface, in this case the under-surface, of a plate or wall 10. The source of a secondary jet is also indicated, being arranged to deliver through the plate 10 so as to penetrate into the blast. The attenuable material, such as glass, is also delivered through the plate 10, and in the embodiment of FIG. 1 the point of delivery of the glass into the blast is just downstream of the point of delivery of the jet into the blast. An appropriate fiber collection means is indicated at the right in FIG. 1.

GENERAL STATEMENT OF VARIABLES

One possible way to control the quantity, quality, and size of the resulting fibers is by regulating the flow rate of the attenuable material. The regulation of the flow rate of attenuable material can be accomplished in a number of ways, e.g., by varying the temperature of the attenuable material so as to alter its viscosity characteristics. In the case of glass, generally speaking, the higher the temperature the lower the viscosity; further, when changes in the constituents of the glass are made so as to obtain different fiber quality, in view of its end use, such changes in the constituents of the glass can effect changes in the viscosity at a given temperature.

Other parameters which can be manipulated in order to control toration include the blast and jet fluid compositions, and the temperatures and the velocities of the blast and the jet. Typically, the interacting jets are composed of the same fluid, such as the products of combustion resulting from the burning of a suitable gaseous fuel, and in such circumstances the performance of toration, throughout a considerable temperature range, can be gauged in terms of the relative velocities of the primary and secondary jets. However, it must be kept in view that any substantial differences between the densities, or the viscosities, of the two jets can have a quite considerable impact on toration, and these additional factors can be accommodated in toration by taking account of the kinetic energies of the fluid streams, rather than just their velocities. The kinetic energy of a given volumetric unit of a fluid stream is directlt proportional to the product obtained by multiplying its density by the square of its velocity.

In order to effect toration, the kinetic energy of the jet per unit of volume must be greater than that of the blast in the operational area thereof.

Additional control over the results obtainable by toration can be exercised by varying the orifice sizes, positions and configuration, particularly with respect to the secondary jet. Additional refinements to the basic apparatus are discussed below with respect to the various illustrated embodiments of the present invention.

ANALYSIS OF TORATION — FIG. 2

Figure 2:
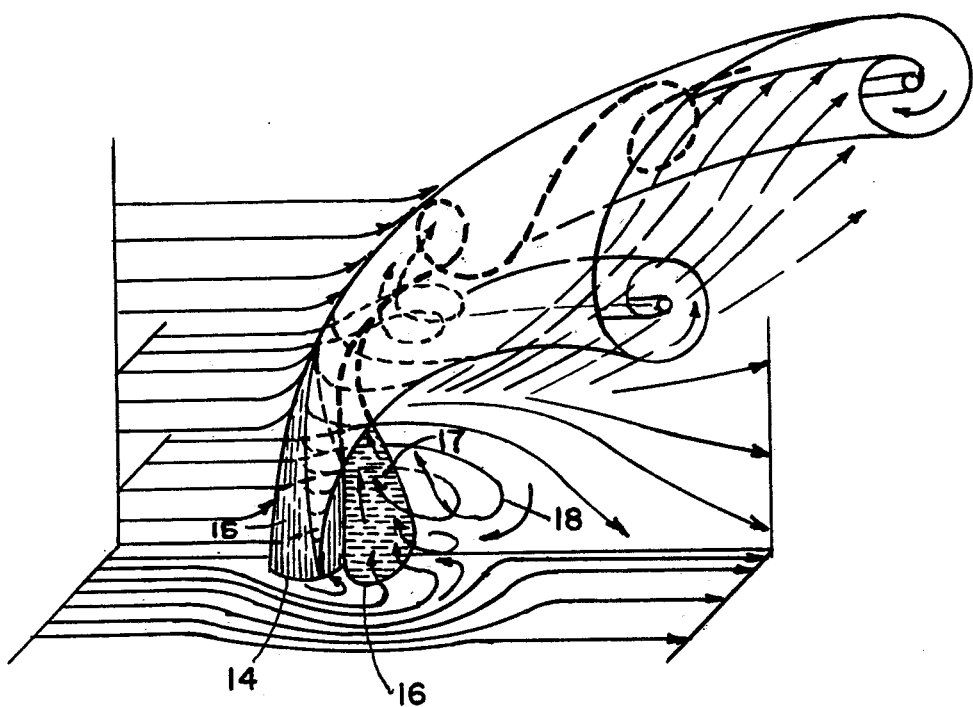

In further explanation of the operative forces responsible for toration, reference is made to FIG. 2 which presents, in part, our actual observations and, in part, our theoretical suggestions and conclusions as to the zone of interaction created by intersecting jets and as to the resultant fluid flow which gives rise to the whirl or miniature tornado phenomena hereinbefore referred to as being of importance in toration. FIG. 2 shows the same general arrangement of the components of a fiberizing center as in FIG. 1, but the secondary jet in inverted position as compared to FIG. 1, that is the jet is directed upwardly instead of downwardly, and further FIG. 2 is on a very much enlarged scale as compared to FIG. 1. It is to be understood that the toration fiberizing center may be arranged in any desired relation to the horizontal.

In the representation of toration as appearing in FIG. 2, the principal jet or blast travels from left to right. The secondary jet 15 is oriented substantially perpendicular to the principal jet and, in a sense, can be said to intercept it, with respect to a part of the blast. The relative relationship of the principal jet and the secondary jet is such that the secondary jet is completely enveloped by the principal jet. The significance of this operative relationship will become more readily apparent from the analysis of the complete process of toration which is presented herebelow.

JET INTERACTION ACTIVITY

The blast splits and flows around the secondary jet while the secondary jet substantially maintains its thrust and its integrity, and can be said to pierce through the blast.

Since the secondary jet is unconfined (in the sense that it is not within a tube or other solid-walled flow passage), its flow at its periphery induces some fluid of the blast to flow along with it, that is, some fluid of the blast is carried along with the flow of the secondary jet. The interaction results in the generation of a region of relatively reduced pressure that is, negative pressure, immediately downstream of the secondary jet.

The split portions of the blast flow around the secondary jet toward the negative pressure region an thus rejion each other to form strong recirculation currents shown in FIG. 2 by blast flow arrows 18 which curve right around on themselves, and also curve upwardly, and indicate flow having a component generally from right to left, countercurrent to the blast which, as above mentioned, is flowing generally from left to right.

The extent of the negative pressure region is a function of the ratio of the kinetic energies, per unit of volume, of the blast and jet. In the upstream-downstream sense the negative pressure region extends about 2 to 3 jet orifice diameters and in the lateral sense it extends about 1 to 2 jet orifice diameters.

The zone of interaction of the blast and the jet gives rise to the formation of two oppositely rotating tornadoes, or whirls, one on each side of the secondary jet slightly downstream of the midpoint thereof. As clearly shown in Figure these two tornadoes, or embryonic, vortices, swell substantially as they whirl upwardly and turn in a downstream direction.

Thus, the zone of interaction is characterized by the inception of the two oppositely rotating tornadoes and by a region of negative pressure immediately downstream of the base of the secondary jet, the negative pressure being quite pronounced in the region between the bases of the tornadoes and in the region immediately downstream thereof.

As the secondary jet loses its individuality, that is, its initial velocity and direction characteristics, it gives rise to a new flow, a mixture of the jet and blast which can be called a torating flow or torating blast.

The layers of the blast which are adjacent the jet and flow alongside it give the tornadoes their direction of rotation. As a result of this direction of rotation, a fluid particle placed on the outer layers of either tornado would be carried over toward the concavity of the above mentioned double volute, being caught by the two tornadoes like between two counter rotating calendar rollers.

While the outer layers of the tornadoes rotate at velocities which are identical to the velocities of the layers of the blast adjacent the tornadoes, the interior or central portion of each of the tornadoes turns around its own axis at very high speed. Thus, each tornado has an induction effect, in an inward and upward direction, on the adjacent portions of the blast which are flowing around the secondary jet. The induced flow is directed upwardly along and inwardly into the concavity constituting the deformed shape of the residual secondary jet flow and of the mixing layer.

It is surprising that, while the fluid flows at very high velocities in the central portion of each of the tornadoes, these tornadoes are nevertheless stable; their apexes appear to be affixed to the edge of the secondary jet orifice, slightly downstream of the axis thereof, and the gaseous envelopes of the tornadoes are practically immobile.

ACTION ON GLASS

The glass is either emitted directly into the low pressure zone immediately downstream of the secondary jet, or is drawn into this zone in situations in which it is supplied some distance from it. The flow of the glass into this region can be relied upon to take place clearly, even if the glass emission orifice in the plate 10 is not located immediately adjacent the downstream side of the secondary jet. This is so because the recirculation currents, discussed above are quite pronounced and strong. Stated in another way, the glass localizes in the region of negative pressure just downstream of the secondary jet.

When viewed as in FIG. 2, the glass is drawn upwardly under the combined action of the gaseous currents and with the glass orifice 16 in a plate at the boundary of the blast, forms itself into a stable cone. Within the body of the glass, the glass travels out into the cone, essentially by laminar flow, and continuously, uniformly and progressively decreases in cross section as it flows toward the apex of the cone. The steady diminution in cross section is important to the production of a fiber of substantially uniform diameter along its length and insures the continuity of fiberizing.

From inspection of FIG. 2 it can be seen that the diminution in cross section of the glass takes place during, and in phase with, the expansion in the cross section of the two tornadoes, the flow of the glass into the cone occurring within the concavity formed by the tornadoes and the downstream side of the secondary jet. Thus, the glass cone is protected or shielded from the disruptive impact which the blast would have upon it. A resultant is the stability of the flow of the glass which is an important characteristic of toration.

Next to the plate the tornadoes or whirls are of very small cross section and the frictional surface interaction thereof against the glass is of quite limited extent. At locations progressively farther and farther away from the plate, the tornadoes are progressively larger and larger and have progressively larger surface contact with the glass, the consequence being that the tornadoes have a progressively increasing influence on the glass attenuation.

What has been described thus far comprises a process for delivering attenuable material in a molten state at a steady reproducible rate, and in a stream of cross section which is continuously and progressively reducing, into a region in which it can be drawn out into a fine fiber. In other words, the description up to this point concerns the supplying of the glass, in a molten state, to a region of high velocity gaseous flow.

The final phase of the attenuating process, i.e., the drawing out of the attenuable material into very fine fibers, takes place within a short length of glass flow from the tip of the cone and thus extends for only about 3 to 5 jet secondary orifice diameters.

Toration is characterized by dramatically dynamic action. While we have witnessed the behavior of the glass, by the naked eye and by means of high speed motion pictures, the experience undergone by the attenuable material occurs far too fast to be seen by the naked eye, and even too fast to be clearly captured by motion pictures. We have made extensive studies using motion pictures taken at 4,000, 6,500 and 10,000 frames per second and projected at speeds down to one frame per second. These studies have shown with certainty that from one cone tip there is only one single fiber drawn; but there remains an element of uncertainty as to the exact path of travel of this fiber.

What has been observed, particularly by means of the high speed motion pictures above mentioned, is a smooth continuously repititious, whipping action which appears to occur in a single plane but which more probably, because of the rotational nature of the whirling or vortical motion in the region of attenuation, actually follows a helical path, the pitch and the amplitude of which are increasing in the flow direction, for at least a substantial part of the time.

The whipping action of the fibers being attenuated, sometimes causes a fiber to touch against various parts of the equipment, particularly the plate through which the attenuable material is emitted and especially in the region thereof downstream of the fiberizing center. If the equipment so touched by the fiber is hot, there may be a tendency for the fiber to stick, in which case a length of fiber may melt and drop into the product as a piece of unfiberized material.

Figure 3:
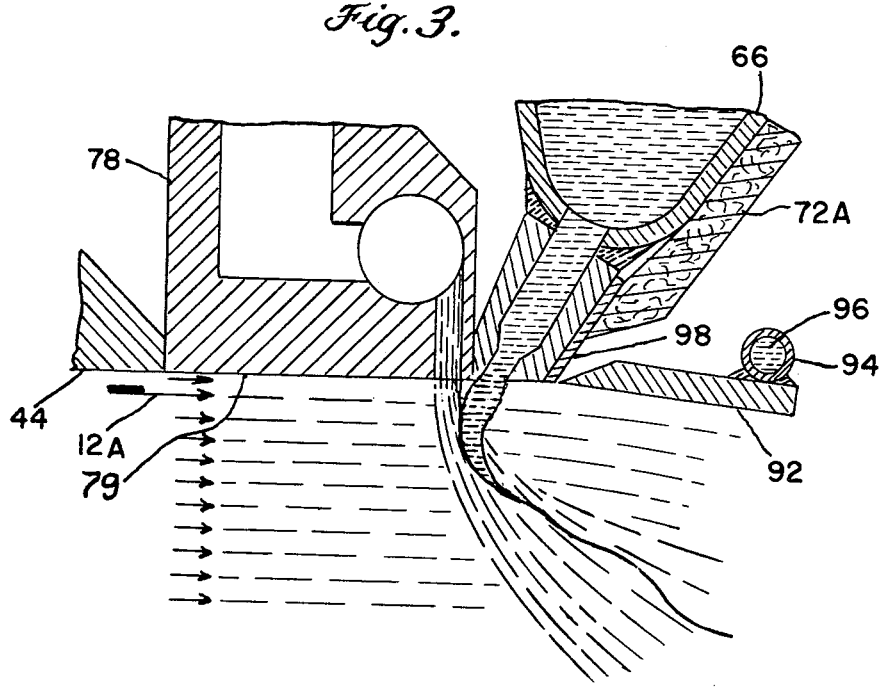
Figure 4:
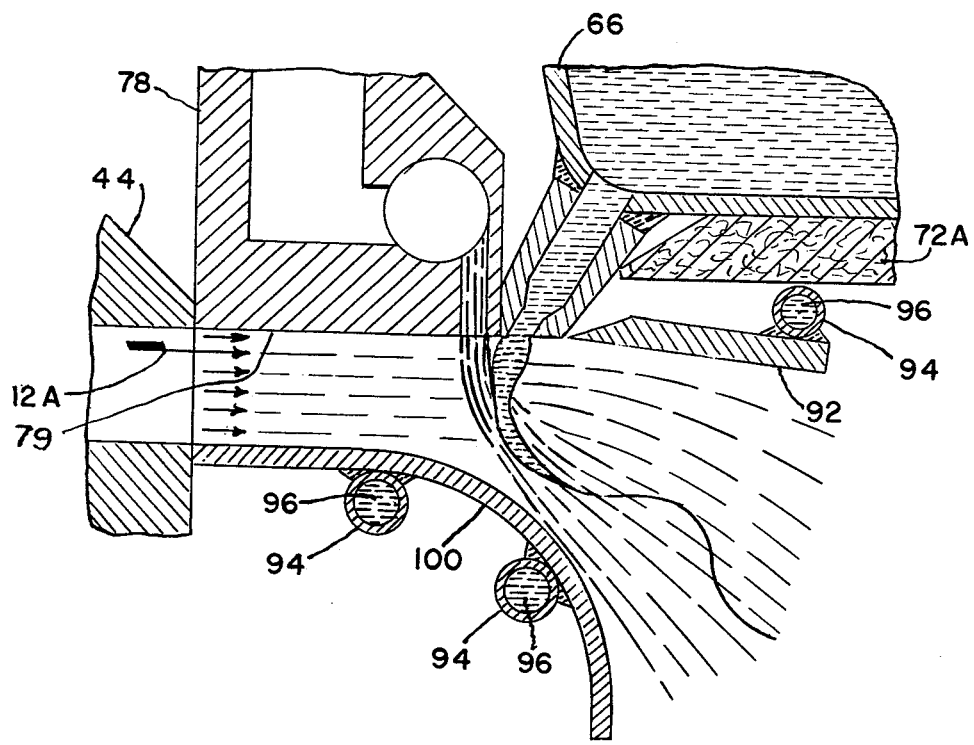

Certain provisions for minimizing such risk of the sticking of fibers, and also for avoiding undesirable cooling of the bottom of the crucible, are illustrated in FIGS. 3 and 4, which show alternative embodiments also incorporating still other features, as will be seen from the following.

FIG. 3

The arrangement of FIG. 3 includes a downstream metal plate 92 having a cooling tube 94 mounted in heat transfer relation to the plate in order to provide for circulation of a cooling liquid 96. The plate 92 is advantageously formed of a metal having good heat conduction characteristics, for instance copper. With this arrangement, even if the whipping action of the fibers being formed brings the fibers into contact with the surface 92, the fibers will not have a tendency to stick and build up because of the fact that the surface is cooled. An arrangement of this kind aids in avoiding possible accumulation of fibers on the surface of the equipment.

With further reference to FIG. 3, the burner lips are indicated at 44, and a carrier jet chamber is indicated at 78, the glass crucible being shown at 66. However, in FIG. 3 an asbestos board 72A is applied to the crucible 66 in a position to aid in minimizing heat loss, thereby maintaining the desired crucible and glass temperature especially in the region of feed of the glass to the glass supply orifice. Such an insulating shield may be employed in a position more or less directly exposed to the blast, but in installations having a blast defining wall element or surface which is cooled, such as the downstream plate 92, the plate is interposed between the gaseous flow and the shielded crucible.

The plate 92, however, is extended in the upstream direction to a point relatively close to the glass supply port, and in order to avoid excessive cooling of the glass adjacent to the discharge orifice, a protective shield of mica indicated at 98 may be introduced. The plate 92 may be oriented, with respect to the plane of the bottom wall 79 of chamber 78, that is, the plane of emission, at a slight angle, as shown. We have found that an angle of between about 3° and about 20° is appropriate, and we prefer an angle in the lower end of this range.

FIG. 4

A similar arrangement of components is shown in FIG. 4, but in FIG. 4 there is further illustrated a lower deflector 100 arranged at the side of the blast opposite to the fiberizing center and preferably curved downwardly in the region opposite to the fiberizing center. This deflector 100 is also desirably provided with pipes 94 in heat exchange relation to the deflector and serving to carry a coolant 96 so that in the event that the whipping action of the fiber causes it to touch the deflector 100, the fiber will not stick to the surface of the deflector.

With respect to the wall elements 92 and 100, it is to be noted that these elements aid in deflecting the flow of gases, particularly downstream of the fiberizing center, and this aids in stabilizing toration, as well as in reducing the risk of the fibers adhering to the surfaces of the equipment.

A noticeable differences in the posture of the cone of attenuable material is observed, particularly when the lower deflector 100 is employed. In the latter case, the tip of the cone of attenuable material appears to project more directly into the core of the blast.

The downstream plate 92 and the lower deflector 100 constitute effective means for guiding and stabilizing the flow resulting from the interaction of the two jets, more or less independently of the velocities of the jets, which makes possible the production of a fiber of highly constant quality. In other words, the downstream plate 92 and deflector 100 constitute means for broadening the range of conditions under which successful operations can be performed for favorably influencing the quality of the fibers produced, although it is pointed out that other embodiments of the equipment are also capable of producing high quality fibers, without the use of such plates or deflectors.

Multiple fiberizing centers are desirably provided in order to maximize production with given equipment and arrangement for achieving the multiplication of the fiberizing centers is to provide one or more series of fiberizing centers spaced from each other in a zone extended transversely or laterally of the blast.

FIG. 5

Before describing FIG. 5 in detail the following should be noted by way of general comparison of the arrangements described above and the arrangement of FIG. 5.

In the arrangements illustrated in the figures described above, the glass admission means, in most cases a glass admission orifice, is located at or substantially at a boundary of the principal jet or blast. In addition in all embodiments already described, the orifice through which the secondary or carrier jet is discharged is also located at or substantially at the same boundary of the principal jet or blast. However, for at least some purposes, it is advantageous and desirable to provide for some separation between the orifices and the boundary of the blast. For instance, such separation facilities control of the atmosphere surrounding the crucible from which the glass is supplied, and such separation also makes possible employment of certain crucible heating arrangements which would not conveniently be accommodated in situations where the glass admission orifice is located at a boundary of the blast.

Figure 5:
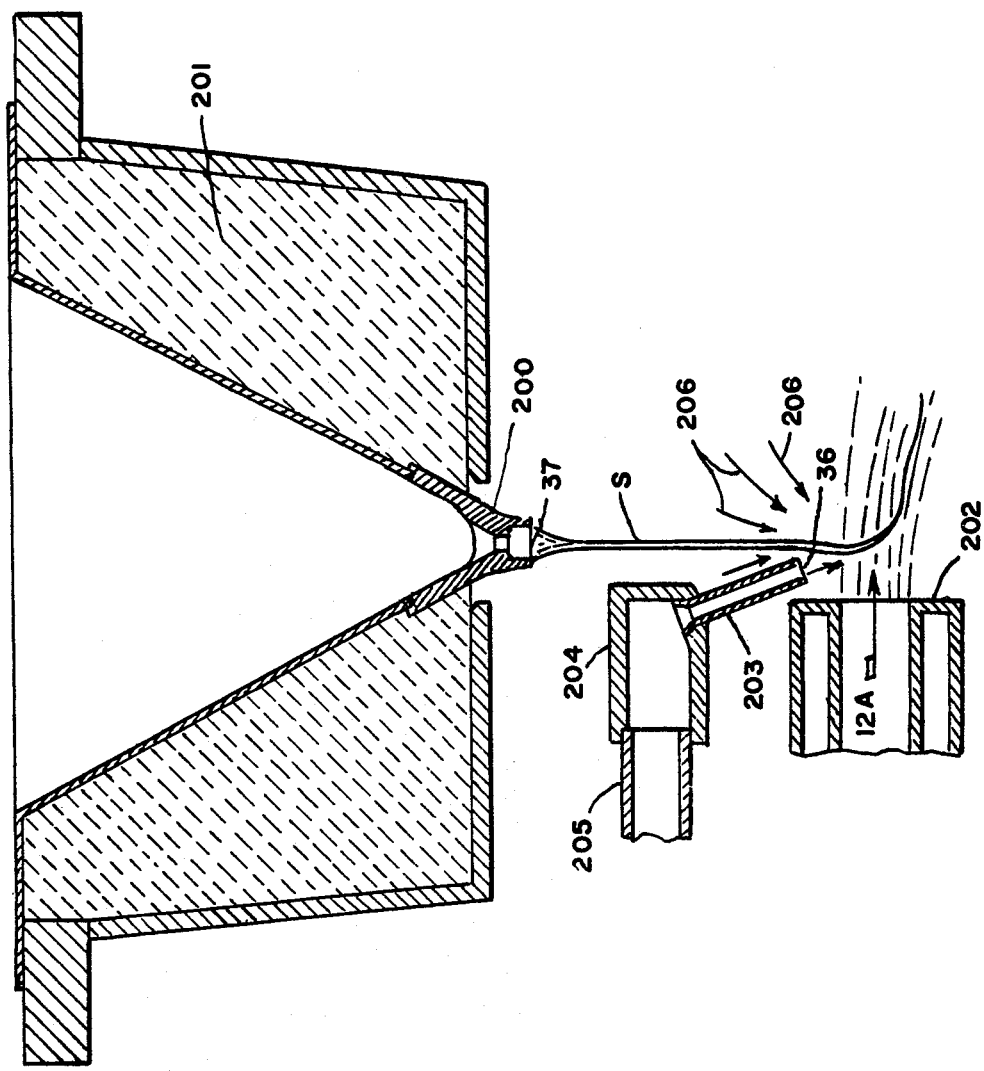
FIG. 5 is a vertical sectional view through a fiberizing center including means for generating a blast, means for generating a secondary jet, and a glass supply means including a glass supply orifice spaced substantially above the upper boundary of the blast.

The arrangement of FIG. 5 provides for separation of the glass admission orifice or glass admission means from the boundary of the blast. This may be accomplished by variations of apparatus and method as compared with the embodiments described above, and the embodiment of the equipment shown in FIG. 5 not only accomplishes the foregoing general purpose of provding separation between the glass admission orifice and the boundary of the blast, but also affords other advantages, as is described herebelow.

Referring to the arrangement shown in FIG. 5, a crucible is indicated at 200, being associated with some appropriate glass supply means such as a forehearth 201. The blast 12A is delivered from the structure 202 in a horizontal direction in a position spaced well below the glass crucible 200. The secondary jet orifice 36 constitutes the lower open end of the jet tube 203 which is supplied from the manifold 204 connected with a burner or other source of secondary jet gas by means of the duct 205. It will be noted that the jet tube 203 is positioned at an angle to the axis of the blast 12A and further that the jet orifice 36 is spaced above the upper boundary of the blast delivered from the structure 202. The jet interacts with the blast to produce a zone of interaction as described in detail above, said zone lying substantially vertically below the glass admission orifice 37. The glass is admitted in the form of a stream S descending by gravity from the orifice 37 and entering the zone of interaction of the jet with the blast, with consequent introduction into the fiberizing and attenuating zone in the manner already fully described.

The vertical spacing of the glass admission orifice 37 above the upper boundary of the blast 12A may be of the order of 10 to 100 mm. In addition, the vertical distance from the jet discharge orifice 36 and the upper boundary of the blast may be of the order of 5 to 10 mm.

In this arrangement, the intra-axial distance between the orifices 36 and 37 measured in the upstream-downstream direction of the blast 12A may be from about 4 to 10mm. Still further, because of the positioning and spacing of the various components making up the fiberizing center, it is desirable that the jet tube 203, and thus the jet discharged therefrom should be inclined with respect to the axis of the blast 12A. The angle of the jet with respect to the axis of the blast should be less than 90°, for instance from about 45° or 50° up to about 85°. A preferred range is from about 75° to about 85°. The relationships of spacing and angles should be such as to establish the zone of interaction of the jet with the blast at a point substantially vertically below the glass admission orifice 37. Preferably also the jet tube 203 and thus the jet orifice 36 should be located so that, considered in relation to the direction of flow of the blast 12A, the jet orifice is positioned upstream of the glass stream S, in view of which the inclination of the jet tube 203 results in discharge of a jet having motion generally transversely to the blast, but having a component in the downstream direction of the blast, thereby enhancing the fiberization and the movement of the attenuated fiber downstream of the blast.

Each fiberizing center provided in the manner described in connection with FIG. 5 functions in the general manner fully disclosed in the application for the principal patent above referred to, and the parameters including the kinetic energies of the blast and of the secondary jet in the operational area thereof and the temperatures and velocities of the blast and jet, as well as the temperature of the glass, and the relationship between the sizes of the glass and jet orifices may all generally conform with those parameters as set out above, although it is to be noted that in certain instances some of those parameters may be varied beyond the preferred ranges given.

With the arrangement of FIG. 5, it is practicable to employ a somewhat wider range of ratios of kinetic energy of the secondary jet to the kinetic energy of the blast in the operational area thereof, as compared with the arrangements earlier described hereinabove. Thus, effective results are obtainable within a preferred range of jet to blast kinetic energies extending from about 4:1 to 35:1.

In the arrangement of FIG. 5, the size of the jet orifice may be considerably smaller than that employed in the arrangements of the figures previously described. For instance, with arrangements of the kind shown in FIG. 5, the jet orifice may be considerably smaller than the glass orifice, i.e. from about one-sixth of the size of the glass orifice up to about the same size, may vary from about 0.3 to 2.5 mm. Employing a smaller jet orifice requires concurrently employing a higher jet pressure with other operating conditions maintained at about the same values. Jet pressures running from about 2 bars up to about 25 bars may be used.

In arrangements of the kind disclosed in FIG. 5, the intra-axial spacing of the jet and glass orifices measured in a direction upstream and downstream of the blast may be of the order of 3 to 4 times the diameter of the jet orifice, or from about 1 mm to about 10 mm.

The smaller secondary jet size is economically desirable because of a resultant saving of fuel consumption which would otherwise be needed.

In the operation of a fiberizing center as illustrated in FIG. 5 air currents are induced by the action of the jet delivered from the orifice 36 as indicated by the arrows 206, and these induced air currents influence the position of the glass stream S, tending to draw the stream toward the jet as the boundary of the blast is approached, and this action has a stabilizing tendency, i.e. it tends to assure uniform and stable entry of the glass stream into the zone of interaction of the jet and blast, with consequent uniform and stable introduction of the glass into the attenuation zone.

From FIG. 5 it will be observed that considerable space is provided between and around all of the major components of the fiberizing station, including the crucible, the manifold for supplying jet fluid to the secondary jet tube, and the equipment for generating and discharging the blast. Because of this increase in the spacing of the components at the fiberizing center, the heat transfer from the crucible to the blast and jet generators may more effectively be avoided. This in turn enhances the possibilities of controlling the glass temperature. The arrangement also permits using compositions which melt at much higher temperatures, or alternatively permits achieving higher glass through-puts.

It is to be understood that it is contemplated that the fiberizing centers be employed in multiple transversely of the blast.

The glass admission means used in an arrangement of the kind shown in FIG. 5 may either comprise a simple orifice, or may comprise an arrangement in which the orifice delivers the glass into and through a small passage enlargement or reservoir arranged just downstream of the orifice.

FIG. 6

Figure 6:
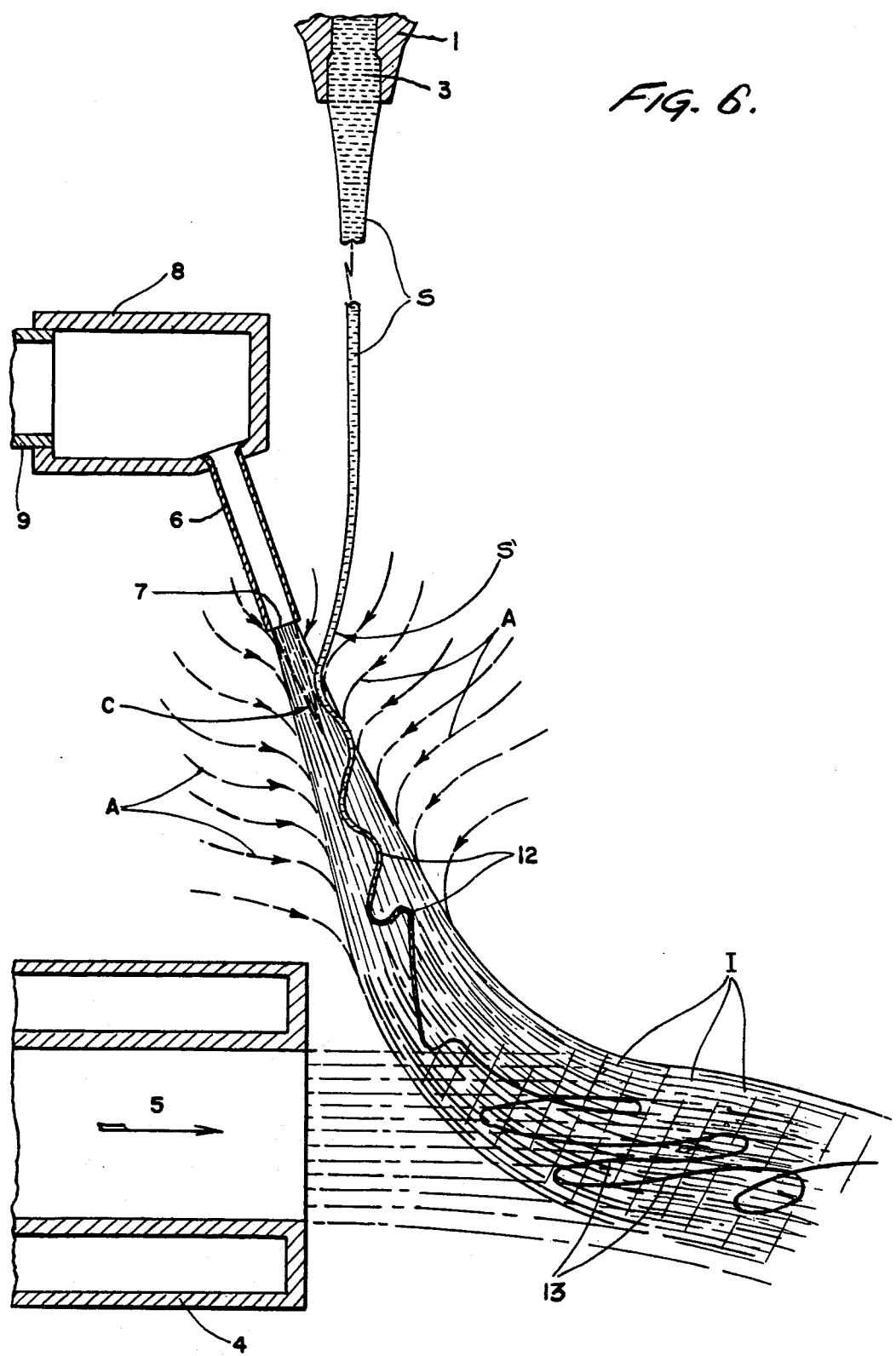
FIG. 6 is a vertical sectional view through the components of a fiberizing center in which both the glass supply means and also the jet generator are spaced from the blast, this figure also appearing in our application Ser. No. 676,755 above identified.

In considering the arrangement of FIG. 6, it is first desired to refer to the general arrangement of FIG. 6 in contrast to the arrangement of FIG. 5. Thus, while the arrangement of FIG. 5 involves some separation of the glass admission means from the boundary of the blast, the arrangement of FIG. 5 nevertheless contemplate in each fiberizing center, the delivery of the glass to the blast in the zone of interaction thereof with the jet. In contrast, in the arrangement of FIG. 6, the glass orifice is not only separated from the boundary of the blast, but in addition, the glass is delivered into the influence of the jet before reaching the blast.

Moreover, in a typical case according to the embodiment of FIG. 6, the blast is discharged in a generally horizontal direction, the glass admission orifices are arranged in spaced relation above the blast, and at an intermediate elevation, secondary jets are discharged downwardly toward the blast from jet orifices positioned adjacent to the decending glass streams, and preferably inclined somewhat with respect to the vertical, so that the glass streams enter the influence of the jets at a point above the upper boundary of the blast, but well below the glass orifices. Preferably also each secondary jet orifice and the associated glass stream are spaced from each other in a direction upstream and downstream of the direction of flow of the blast, with the jet orifice located, with respect to the direction of flow of the blast, on the upstream side of the glass stream.

The system of this embodiment, as just briefly described, functions in the following manner:

Each secondary jet, being spaced appreciably above the upper boundary of the blast, causes induction of the ambient air so that the jet develops a sheath or envelope of induced air which progressively increases in diameter as the upper boundary of the blast is approached. The jet thus is comprised of two portions, i.e. the core itself which is initially delivered from the jet orifice and the main body of the jet which is frequently referred to as the mixing zone, i.e. the zone represented by the mixture of the gas of the core with induced air.

In a typical embodiment, the jet core extends for a distance beyond the jet orifice equal to from 3 to 10 times the diameter of the jet orifice, depending primarily upon the velocity of the jet through the orifice. Since in installations of the kind here involved, the jet orifices are of only very small diameter, the extent to which the jet core is projected beyond the orifice is relatively short. The jet core is conical and the mixing zone surrounds the jet core from the region of delivery from the jet orifice and is of progressively increasing diameter downstream of the jet, including a length of travel extended well beyond the tip of the jet core cone. In such a typical installation, the spacing between the jet orifice and the boundary of the blast is such that the point of intersection of the blast lies beyond the tip of the core, although with certain proportions the jet core may come close to or somewhat penetrate the blast. In any event, it is contemplated that at the point of intersection of the jet and blast, the body of the jet or jet stream retains sufficient kinetic energy or velocity to penetrate the blast and thereby develop a zone of interaction between the jet and the blast. This zone of interaction has the same general characteristics as the zone of interaction referred to and fully described in our prior applications Ser. No. 557,282 and Ser. No. 353,984, above identified.

With the foregoing in mind, attention is now directed to the glass stream and its behavior in relation to the jet and blast. As already noted, the glass stream is delivered from an orifice spaced above the blast and also spaced appreciably above the point of delivery or discharge of the secondary jet. Preferably the glass discharge orifice is so located as to deliver a stream of glass which by freefall under the action of gravity will follow a path which would intersect the axis of the jet at a point appreciably above the upper boundary of the blast and thus also above the zone of interaction. As the glass stream approaches the jet, it is influenced by the currents of induced air and is thereby caused to deflect toward the jet above the point where the glass stream would otherwise have intersected the axis of the jet. The induction effect causes the stream of glass to approach the jet and, depending upon the position of the glass orifice, the induction effect will either cause the glass stream to enter the envelope of induced air surrounding the core, or will cause the glass stream to enter the main body of the jet at a point downstream of the jet core. In either case, the glass stream will follow a path leading into the mixing zone and the glass stream will travel within the body of the jet downwardly to the zone of interaction with the blast.

Thus, the glass stream is carried by the induced air currents into the mixing zone of the jet, but does not penetrate the jet core. The glass stream may be carried by the induced air to the surface of the jet core, but will not penetrate the core, which is desirable in order to avoid fragmentation of the glass stream. Since the glass stream is at this time in the influence of the mixing zone of the jet, the stream of glass will be subjected to a preliminary attenuating action and its velocity will increase as the upper boundary of the blast is approached.

In addition to this attenuating action, which is aerodynamic in character, the attenuating stream is subjected to certain other dynamic forces tending to augment the attenuation. This latter attenuation action is caused by the tendency for the attenuated stream to move toward the center of the jet and then be reflected toward the boundary of the jet into the influence of the air being induced. The attenuating stream is then again caused to enter into the interior of the jet. This repeated impulsion supplements the aerodynamic attentuating action.

In the region of interaction with the blast, the partially attenuated stream of glass will be caused to enter the zone of interaction, in part because of the acceleration of the glass resulting from the action of gravity and from the preliminary attenuation described just above, and in part under the influence of the currents established in the zone of interaction itself, in the manner fully explained in our prior applications Ser. No. 557,282 and Ser. No. 353,984, above identified.

Thus it will be seen, that according to the embodiment of the invention shown in FIG. 6, the glass stream is subjected to two successive stages of attenuation. It is also to be observed that since the glass stream is caused to come under the influence of the jet by virtue of the induced currents surrounding the jet, the preliminary attenuation is accomplished without fragmenting the glass stream. Moreover the succeeding or second stage of attenuation which is effected in the zone of interaction between the jet and the blast is also accomplished without fragmenting the fiber being formed. By this two-stage attenuating technique it is thus possible to produce long fibers.

The technique of the present invention has important advantages as compared with various prior techniques. Thus, it provides a technique for the production of long fibers while at the same time making possible greater separation between certain components of the equipment, notably the blast generator or burner, with its nozzle or lips, the jet nozzle and the gas or air supply means associated therewith and the glass supply means including the bushing or similar equipment having glass orifices. This separation of components is not only of advantage from the standpoint of facilitating the structural installation, but is further of advantage because the separation makes possible more convenient and accurate regulation of operating conditions, notably temperature of the blast, jets and glass supply means. Still another advantage of the arrangement according to the present invention, is that the spacing of the glass supply means with its orifices for discharging streams of glass makes possible the utilization of larger glass orifices (which is sometimes desirable for special purposes or materials) because, in the distance of free-fall provided for the glass streams, such streams decrease in diameter under the influence of the gravitational acceleration. The streams should of course be of relatively small diameter at the time of initiation of attenuation, and the desired small diameter can readily be achieved, because of the distance of free-fall, notwithstanding the employment of delivery orifices of relatively large size.

The foregoing has still another advantageous feature, namely the fact that a higher temperature may be utilized in the glass bushing or other supply means, thereby enabling use of attenuable materials at higher temperatures, because during the distance of free-fall of the glass stream, the stream is somewhat cooled because of contact with the surrounding air, thereby bringing the stream down to an appropriate temperature for the initiation of attenuation.

Because of various of the foregoing factors, the system of this embodiment of the present invention facilitates the use of certain types of molten materials in the making of fibers, for instance slag or certain special glass formulations which do not readily maintain uniformity of flow through discharge orifices of small size. However, since both larger diameter discharge orifices and higher temperatures may be used in the supply of the molten material, it becomes feasible to establish uniformity of feed and attenuation even with certain classes of attenuable materials which could not otherwise be employed in a technique based upon production of fibers by attenuation of a stream of molten material.

In FIG. 6, the glass supply means includes a crucible or bushing 1 which may be supplied with molten glass in any of a variety of ways, for instance by means of a forehearth. Glass supply orifices 3 deliver streams of molten glass downwardly under the action of gravity as indicated at S.

A gaseous blast is discharged in a generally horizontal direction from the discharge nozzle 4, the blast being indicated by the arrow 5. The blast may originate in a generator, usually comprising a burner, so that the blast consists of the products of combustion, with or without supplemental air.

As will be seen from the drawings, the blast is directed generally horizontally below the orifices 3 from which the glass streams S are discharged.

At an elevation intermediate the crucible and the blast discharge device 4, jet tubes 6 are provided, each having a discharge orifice 7, the jet tubes receiving gas from the manifold 8 which in turn may be supplied through the connection fragmentarily indicated at 9.

The gases for delivery to and through the jet tubes 6 may originate in a gas generator taking the form of a burner and the products of combustion may serve for the jet, either with or without supplemental air. Preferably the combustion gases are diluted with air so as to avoid excessively high temperature of the gas delivered through the jet tubes. Alternatively, the jet gas may be derived from a compressor and may be used at a lower temperature, for instance ambient or room temperature.

Each jet tube 6 and its orifice 7 is arranged to discharge a gaseous jet downwardly at a point closely adjacent to the feed path of one of the glass streams S and preferably at the side of the stream S which, with respect to the direction of flow of the blast 5, is upstream of the glass stream. Moreover, each jet tube 6 and its orifice 7 is arranged to discharge the jet in a path directed downwardly toward the blast and which is inclined to the vertical and so that the projection of the paths of the glass stream and the jet intersect at a point spaced above the upper boundary of the blast 5.

It is contemplated that the vertical dimension of the blast and also the width thereof be considerably greater than the cross sectional dimensions of each secondary jet, so that adequate volume of the blast will be available for each jet to develop a zone of interaction with the blast. For this purpose also, it is further contemplated that the kinetic energy of the jet in relation to that of the blast, in the operational zone of the jet and blast, should be sufficiently high so that the jet will penetrate the blast. As pointed out in our applications Ser. No. 557,282 and Ser. No. 353,984, this requires that the kinetic energy be substantially higher than that of the blast, per unit of volume. Still further, the jet preferably has a velocity considerably in excess of the velocity of the glass stream as fed under the action of gravity downwardly toward the point of contact with the jet, but the jet velocity may either be lower than or in excess of the velocity of the blast.

The operation of each fiberizing center is as follows:

From FIG. 6, it will be seen that the core C of the jet causes the induction of currents of air indicated by the lines A, the amount of air so induced progressively increased along the path of the jet. When the body of the jet, i.e. the gas of the core intermixed with the induced air, reaches the boundary of the blast, a zone of interaction is established in the region indicated by cross-lining marked I.

As the stream S of molten glass descends and approaches the jet delivered from the orifice 7, the currents of air induced by the action of the jet cause the stream of glass to deflect toward the jet core as indicated at S'. Although the glass orifice 3 may be of substantially larger diameter or cross section than the jet orifice 7, the gravity feed of the glass stream S results in substantial reduction in diameter of the glass stream, so that when the stream meets the jet, the diameter of the stream is much smaller than the diameter of the glass orifice. With the higher velocity of the jet, as compared with that of glass stream, even when the glass stream meets the jet in the upstream region adjacent the jet core, the glass stream will not penetrate the jet core. However, because of the induced aur currents surrounding the jet, the glass stream is caused to "ride" on the surface of the jet core within the surrounding sheath of induced air or to enter the body of the jet downstream of the jet core.

The action of the induced air in bringing the glass stream to the stabilizes the feed of the glass stream and will also assist in compensating for minor misalignment of the glass orifice with respect to the jet orifice. Because of the reliance upon induction effects of an isolated jet, the glass stream is brought into the mixing zone of the gas originating in the jet core and the induced air without subdivision or breakage of the stream or the fiber being formed. This action is enhanced by virtue of the fact that in the arrangement as above described and illustrated, the glass stream is not subjected to any sharp angled change in its path of movement before it has been subjected to some appreciable attenuation, thereby reducing its diameter and inertia.

In consequence of the glass stream being carried in the mixing zone of the jet, the glass stream is partially attenuated, this action representing the first stage of the two-stage attenuation above referred to. In turn, in consequence of this partial attenuation, the length of the embryonic fiber is increased, and this increase in length is accommodated by an undulating or whipping action, thereby forming loops, as indicated at 12. It is to be noted, however, that the glass stream remains intact, the loops of the embryonic fiber being carried downwardly in the mixing zone.

At the point where the blast 5 intercepts the jet, the jet penetrates the blast. This penetration of the blast by the jet establishes currents in the zone of interaction of the jet with the blast, which currents carry the partially attenuated glass stream into the interior of the blast and in consequence a second stage of attenuation occurs. This results in further increase in the length of the fiber being formed. The increase in fiber length is accommodated by additional undulating or whipping action, forming further enlarged loops as indicated at 13 within the blast. Notwithstanding this action, a typical fiber will remain intact and will be carried away by the blast flow in the form of a fiber of considerable length. Thus a single stream of molten glass is converted into a single glass fiber by a two-stage attenuation operation. It will be understood that in effecting this two-stage attenuation, the temperature of the glass and the temperature of the jet, as well as the temperature of the blast, are established at values which will retain the glass in attenuable condition throughout the first stage of attenuation and throughout the second stage until the attenuation has been completed in the zone of interaction between the jet and the blast.

In connection with the arrangement of FIG. 6, it is to be understood that fiberizing centers may be arranged in multiple, transversely of the blast.

The disclosure of the above identified applications Ser. No. 557,282 and Ser. No. 353,984, may be referred to for further information in connection with the general arrangements providing for accommodation of multiple fiberizing centers and also for numerous other features, such, for example, as fiber collection means, glass feed systems and blast and jet generating and delivery systems, and including also information concerning various parameters involved in establishing a zone of interaction of a jet and blast.

In connection with various dimensional relationships involved in the equipment of FIG. 6, reference may be made to our application Ser. No. 676,755.

FIGS. 7–17B

These figures illustrate an embodiment of the invention which, as in all of the other embodiments illustrated, a toration or interaction zone is established by penetration of a jet into a blast, the fiber being attenuated in said zone by the action of the pair of tornadoes therein. The embodiment of FIGS. 7 to 17B also has in common with the embodiments of FIGS. 5 and 6, a separation of the glass admission means from the blast.

Still further the embodiment of FIGS. 7 to 17B has in common with the embodiment of FIG. 6, the mutual separation of both the glass admission means and the jet generator from the blast as well as the arrangement of the components to provide for delivery of the glass initially to the jet to be carried thereby into the zone of interaction of the jet with the blast thereby providing a first stage of attenuation of the glass in the jet and a second stage of attenuation in the toration zone resulting from penetration of the jet into the blast.

The arrangement of FIGS. 7–17B however has distinctive features including provision for development of a pair of counter-rotating tornadoes in the flow of the jet, with a zone of substantially laminar flow between the tornadoes, the glass or other attenuable material being delivered to the zone of laminar flow. This embodiment also provides for deflection or guiding of the jet from one path into another path, the latter being directed toward the blast. These distinctive characteristics of the embodiment of FIGS. 7–17B have numerous advantages, as is fully developed in the following analysis of the arrangement and its operation, as compared with various of the other embodiments.

As disclosed in the embodiments of FIGS. 1 to 4 above referred to, the stream of attenuable material is delivered or introduced into the zone of interaction by the placement of a discharge orifice for the attenuable material at or substantially at the boundary of the blast. It is a major objective of the embodiment of FIGS. 7 to 17B to provide for the separation of the discharge orifice for the attenuable material from the boundary of the blast and at the same time to provide for such separation while maintaining stable delivery of the attenuable material into the system. The manner in which this is accomplished will be developed more fully herebelow.

In accordance with one important aspect of the present invention, provision is made for the generation of a pair of counter-rotating whirls or tornadoes, by establishing a gaseous flow or jet and by utilizing certain jet guiding structure or deflector arranged (in the manner more fully described hereinafter) to generate a pair of counter-rotating whirls or tornadoes having therebetween an area of substantially laminar flow also characterized by low pressure with consequent pronounced induction of air. It will be noted that, in accordance with this aspect of this embodiment of the present invention, the pair of counter-rotating tornadoes is generated by guide structure influencing a gaseous flow or jet, rather than by the penetration of a jet into a blast, as in the toration technique described above in connection with FIGS. 1 to 4. The action of the deflector not only develops the pair of tornadoes but also provides the substantially laminar flow low pressure area between the pair of tornadoes, and the present invention contemplates the introduction or delivery of a stream of attenuable material, for instance, molten glass, into the influence of the induced air entering the zone or area of laminar flow formed between the pair of counter-rotating tornadoes. This results in introduction of the stream of attenuable material into the laminar flow between the tornadoes and thence into the influence of the high velocity currents of the pair of tornadoes, with consequent attenuation of the stream to form a fiber.

In accordance with another important aspect of this arrangement, the attenuation technique above described, including the generation of the oppositely rotating tornadoes acting on a gaseous jet is used as a first stage of a two-stage attenuation technique, the second stage being effected by delivery of the jet and the attenuating fiber carried thereby transversely into a blast of larger cross section, the jet still retaining sufficient kinetic energy to penetrate the blast and develop a zone of interaction in accordance with the toration technique described in the above. This results in introduction of the preliminarily attenuated fiber into the zone of interaction of the jet and the blast, with consequent further attenuation of the fiber.

By the above described operation, a single fiber is formed from a single stream of the attenuable material, notwithstanding the fact that the stream is subjected to two sequential stages of attenuation, each of which involves the subjection of a stream or fiber to the action of the high velocity currents set up by the two sequential pairs of tornadoes generated in the jet and in the blast.

Employment of this technique has numerous distinctive advantages. In the first place, from the foregoing it will be seen that the use of the pair of tornadoes developed by jet guiding means as a first stage of the attenuating operation, serves also as a means for introduction of the attenuating fiber into the zone of interaction between the jet and the blast, i.e. into the torating zone. Thus, this first stage is in effect utilized as a feed or delivery means in relation to the toration operation subsequently carried on in the toration zone between the jet and blast. This use of the first stage has numerous important advantages. In the first place such use makes it possible for substantial separation of the several components of the system, namely the means for generating the blast, the means for generating the jet, and the means for introducing or delivering the attenuable material into the system.

Separation of the components is in turn advantageous for a number of reasons including particularly the fact that such separation reduces heat transfer between the three components of the system, in view of which greater flexibility is possible in the maintenance of different temperatures as between the means for generating the blast, the means for generating the jet and the means for supplying and admitting the attenuable material. In turn, such reduction in heat transfer between these components makes possible the use of the system for the production of fibers from materials, such as hard glasses, which require relatively high temperatures to bring them to the molten state or consistency appropriate for attenuation.

The separation of the components which is made possible, also eliminates or reduces the production of unfiberized or improperly fiberized particles resulting from sticking of the attenuable material on hot surfaces. In consequence, more uniformily fiberized products are obtainable.

Still further, the employment of the two-stage system described, in which the first stage serves as a means for feeding the attenuable material into the zone of interaction of the jet and blast, i.e. the toration zone, is desirable because it provides a means for stabilizing feed of the attenuable material into the zone of interaction, notwithstanding the substantial separation of the supply means for the attenuable material from the boundary of the blast. Indeed, even with quite substantial separation, the feed of the attenuable material is stabilized and accurately controlled, which is an important factor in providing for uniform fiberizing in the zone of interaction, i.e. for uniform toration. Because the first stage or feeding means utilizes a pair of counter-rotating tornadoes generated in spaced relation by the guiding action of elements positioned to influence the jet, the laminar flow low pressure area between the tornadoes into which the attenuable material is delivered, results in accurate feed of the stream of attenuable material from that area into the region between the counter-rotating tornadoes, and this accuracy is maintained even in the event of some misalignment of the supply orifice for the attenuable material with relation to the jet.

In consequence of this "automatic" compensation for inaccuracies in the point of supply of the attenuable material, high precision machining of certain parts is no longer necessary, for instance parts associated with the feed of a stream of molten glass. Such high precision of machining is not readily compatible with the very high temperatures encountered in the handling of molten glass, and this is particularly so where very hard glasses or certain other materials such as slags or certain rocks are being fiberized.

It is also noted that as an alternative, a slot may be employed for admission of the attenuable material in the general manner disclosed in FIGS. 12 and 12A of our prior application Ser. No. 353,984 above identified, in which event, supplementary secondary jets would be located one beyond each end of the slot.

The technique of FIGS. 7 to 17B is also of advantage because it may be employed in connection with a wide variety of attenuable materials, including not only various mineral materials as mentioned above, but even certain organic materials which may be attenuable, such as polystyrene, polypropylene, polycarbonate and polyamides.

In the two-stage attenuation technique above referred to, the invention also contemplates employment of certain novel interrelated conditions of operation of the gaseous jet and gaseous blast, providing improved efficiency with respect to power or energy consumption. Thus, the invention contemplates establishment of a torating zone or zone of interaction between the jet and blast by employment of lower jet velocities and temperatures than used in other arrangements establishing the zone of interaction between a jet and blast. By employing lower jet temperatures (for instance a temperature approximating ambient or room temperature), consumption of energy to heat the jet is eliminated and, in addition, the gas of the jet is increased in density. In consequence, the kinetic energy level of the jet required for penetration of the jet into the blast is provided at lower jet velocities, thereby effecting further power economies. When employing such lower jet temperatures, it is even possible to employ jet velocities well below the velocity of the blast and still maintain the kinetic energy level of the jet sufficiently high to provide the desired penetration of the jet into the blast.

The lower jet velocities are still further of advantage in the two-stage attenuation technique herein disclosed because in the first stage of attenuation, in which the stream of attenuable material is delivered to the jet, the lower jet velocities and temperatures assist in avoiding fragmentation of the stream of attenuable material.

Although, for most purposes, it is contemplated according to the technique of FIGS. 7 to 17B, that the fiberization of the attenuable material be effected in two stages in the manner generally described above, it is to be noted that for some purposes the attenuable material may be subjected to only the first stage of the fiberization described, i.e. may be subjected to only that stage of the fiberization occurring as a result of the feed of the attenuable material into the zone between the counter-rotating tornadoes developed by the action of guide element employed with the jet. In this event, the blast, i.e. the torating blast, and the penetration of the jet into the blast may be dispensed with, thereby simplifying the equipment set up.

Although the technique here under consideration is applicable to any attenuable material, it is particularly adapted to the attenuation of thermoplastic materials such as glass and similar compositions which are heated to the molten state or the molten consistency appropriate for attenuation. The embodiment illustrated in FIGS. 7–17B and described hereinafter is particularly appropriate for use in the attenuation of glass or similar compositions, and where references are made to glass, unless otherwise indicated by the context, it is to be understood that any appropriate attenuable material may be used.

In connection with the drawings, reference is first made to FIG. 7 which shows somewhat schematically a typical overall arrangement of equipment. Toward the left in FIG. 7 there is shown in outline at 15' a portion of a burner or blast producing structure having an associated nozzle 16' with a discharge aperture 17' of substantial width so as to deliver a blast 18' with which a plurality of fiberizing centers may be associated. A supply line for a gaseous fluid under pressure is indicated in FIG. 7 at 19' and this supply line is connected to jet manifold boxes 20' which cooperate in supplying the jet fluid to and through jet orifices, one of which appears at 21'.

A bushing 22' associated with a forehearth or other appropriate glass supply means indicated at 23' is provided with glass orifice means indicated at 24', and the stream of glass is delivered into the flow of the jet to be described hereinafter and is carried downwardly to the zone of interaction in the blast 18'. As will be explained, fiberization occurs in the jet and also in the blast, and as the blast delivers the fibers toward the right as viewed in FIG. 7, a fiber blanket indicated at 25' is laid down upon a perforated traveling conveyor or belt 26', having a suction box 27' below the upper run of the conveyor, the box 27' connecting with a suction fan diagrammatically indicated at 28' to assist in laying down the desired fiber blanket on the perforated conveyor 26'.

Various of the fiberization parts are shown in greater detail in FIGS. 8 to 12 inclusive, to which reference is now made.

The blast and jet structures are advantageously adjustably mounted with respect to supporting structure such as diagrammatically indicated at 29', so that the relative vertical positioning of the blast and the jet may be altered, and preferably also so that the relative positioning of these parts may be adjusted in a direction upstream and downstream of the blast 18'.

As seen particularly in FIGS. 10 and 11, the blast nozzle 16' is of substantial width, thereby providing for a wide blast delivery orifice 17'. The bushing 22' for the supply of glass preferably also has substantial dimension in the direction perpendicular to the plane of FIG. 8 in order to provide for the supply of glass to a multiplicity of the glass delivery devices 24' as clearly appears in FIG. 10. Each of the delivery devices 24' has a metering orifice 24a and preferably also an elongated reservoir or cup downstream of the metering orifice as indicated at 24b (see particularly FIGS. 29 and 30). The reservoirs or cups 24b are desirably elongated in the plane of the fiberizing center, i.e. the plane containing the glass supply device 24' and its associated jet orifice 21'.

The jet orifices 21' are provided in the front edge wall of each of a series of manifold boxes 20' four such boxes being provided in the equipment illustrated, and these boxes are mounted by means of mounting rods, including guide rods 30',30' mounted on the supporting structure 29' and which extend throughout the length of the bushing 23' and which pass through apertures 31' (see FIG. 12) on the mounting lugs 32' provided at each end of each of the jet manifold boxes 20'. Thus, the several jet manifold boxes are mounted with freedom for shifting movement either to the right or left as viewed in FIGS. 10 and 11.

The positions of the jet boxes on the mounting guide rods 30' are determined by means of additional rods 33',34',35' and 36', each of which is threaded at its inner end, to cooperate with a threaded aperture in one of the lugs 32' of the guide boxes, one such threaded aperture appearing at 37' in FIG. 12. Each of the rods 33' to 36' is provided with a notched end 38' by means of which it may be rotated, and these adjustable rods are axially fixed, so that rotation thereof imparts a lateral adjustment or shifting movement to the associated jet manifold box 20'.

By this arrangement, the relative positions of the jet orifices 21' with respect to the glass orifice devices 24' may be adjusted, and this may be used to compensate for thermal expansion and contraction of parts. Having the jet orifices distributed between a number of jet manifold boxes (four in the embodiment illustrated) provides for substantial alignment of the jet orifices with the glass orifices on lines paralleling the flow of the blast. Although the alignment may not be absolute, this is not necessary with equipment of the kind herein illustrated in which the glass streams are delivered into the substantially laminar flow zones between the tornadoes, such as 44b shown in FIG. 34, since as above brought out, delivery of the glass streams into these zones results in automatic compensation for slight inaccuracies in the relative positions of the jet and glass orifices.

Each of the boxes 20' is connected with the jet fluid supply line 19' by means of a pair of flexible connections 39' which permit adjustment of the position of the boxes 20' independently of the supply line 19'.

As hereinabove indicated, it is contemplated according to the present invention that the jets delivered from the jet orifices 21' be subjected to the guiding action of certain elements or devices which cooperate with the jets in generating the desired pairs of counter-rotating whirls or tornadoes which are utilized for at least the preliminary attenuation of the streams of attenuable material and also for purposes of feed of the partially attenuated filaments into the zone of interaction provided by penetration of the jets into the blast, i.e. into the toration zones. For the purpose of developing the counter-rotating pairs of tornadoes, the present invention contemplates the utilization of a guiding means, advantageously a common deflector plate 40' associated with a group of the jet orifices. Where the jets are subdivided into groups, and each group associated with a manifold box such as indicated at 20', each such box desirably carries a deflector plate 40'. As seen particularly in FIGS. 13 and 14, the guide or deflector plate is desirably formed as a bent plate, one portion of which overlies and is secured to the jet manifold box and the other portion of which has a free edge 41' lying in a position in the path of flow or core of the jets delivered from the jet orifices 21', advantageously along a line intersecting the axes of the jet orifices.

Figure 13:
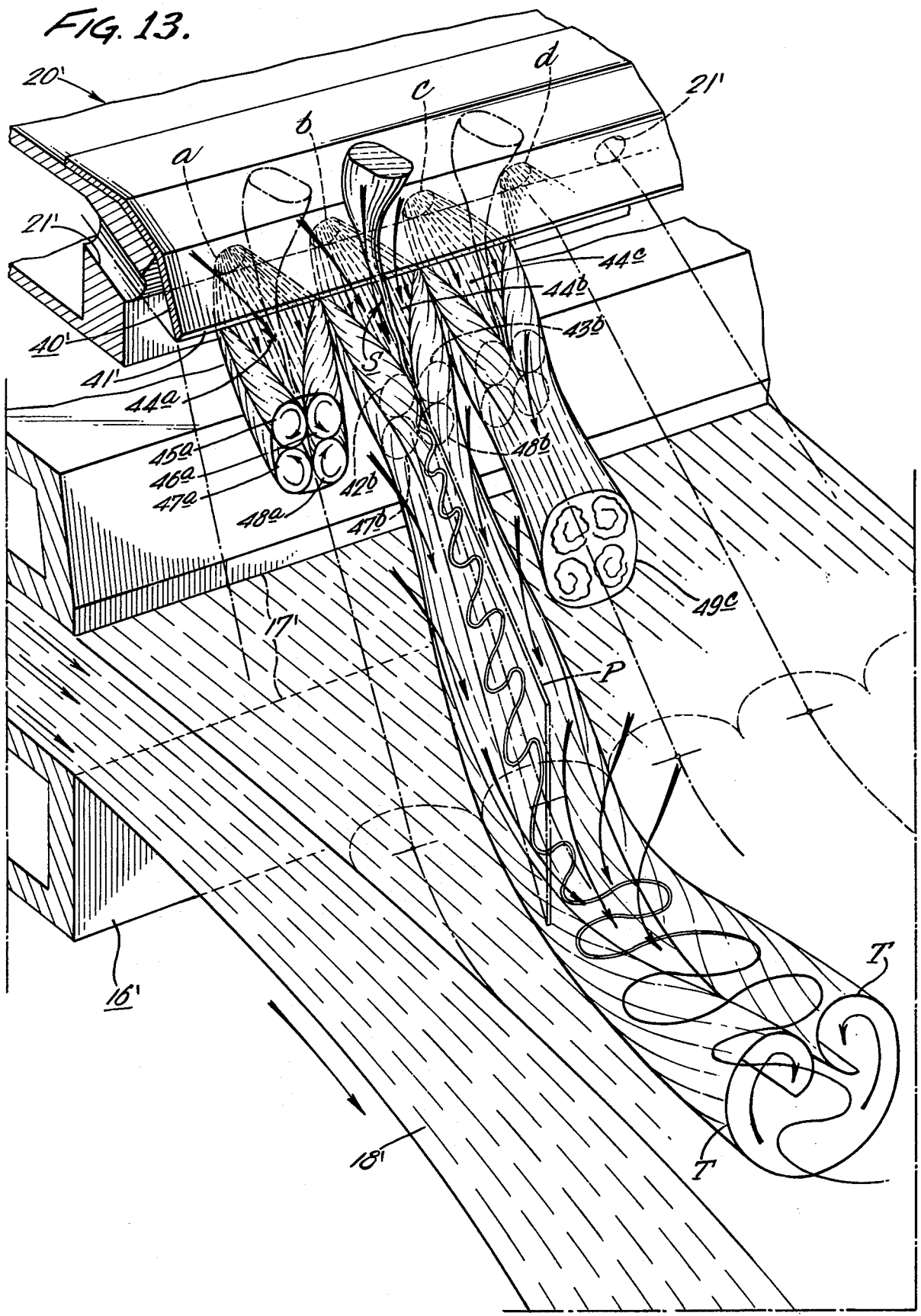

As is graphically illustrated, particularly in FIG. 13, this position of the deflector plate 40' and its edge 41' results in impingement of each of the jets upon the underside of the plate 40' with consequent spreading of the jets. Thus, in FIG. 13, the flow of four of the jets originating from orifices a, b, c, and d is shown, and it will be seen that as the edge 41' of the plate is approached, each of the jets spreads laterally.

It is contemplated according to the invention that the jet orifices 21' be placed sufficiently close to each other and also that the deflector or guiding means be arranged so that upon lateral spreading, the adjacent or adjoining jets will impinge upon each other in the region of the edge 41' of the deflector plate. Preferably, the adjacent jets impinge upon each other at or close to the free edge 41' of the guide plate 40' as is shown in FIG. 13. This results in the generation of pairs of counter-rotating whirls or tornadoes which are indicated in FIG. 13 in association with each of the three jets delivered from the orifices a, b and c.

In analyzing the formation of these tornadoes, particular reference is made to those associated with the jet originating from orifice b in FIG. 13. Thus, it will be seen that tornadoes 42b and 43b, are generated and that these two tornadoes have their apices originating substantially at the edge 41' of the deflector 40' at opposite sides of the jet at the zone in which the spreading jet impinges upon the adjacent spreading jets delivered from orifices a and c. The tornadoes 42b and 43b are oppositely rotating as is indicated particularly in FIG. 16, and the tornadoes enlarge as they progress, until they meet at a point spaced downstream from the edge 41' of the deflector. These tornadoes 42b and 43b also have currents in the downstream direction, as will be seen.

Because of the spacing of the apices or points of generation of the tornadoes 42b and 43b and because of the progressive enlargement of those tornadoes, a generally triangular zone 44b intervenes between the tornadoes and the edge 41' of the deflector plate, and this triangular zone is of relatively low pressure and is subjected to extensive inflow of induced air, but the flow in this zone is substantially laminar. This is the zone into which the stream of molten glass or other attenuable material is introduced into the system, and because of the character of this triangular laminar zone the stream of glass is not fragmented but is advanced as a single attenuating stream into the region between the pair of tornadoes.

Attention is now called to the fact that the directions of rotation of the currents in the tornadoes 42b and 43b are opposite, being clockwise for tornado 42b and counter clockwise for tornado 43b as viewed in FIG. 13. Thus, the currents in these two tornadoes approach each other at the upper sides thereof and then flow downwardly toward the central or laminar zone 44b.

Figure 16:
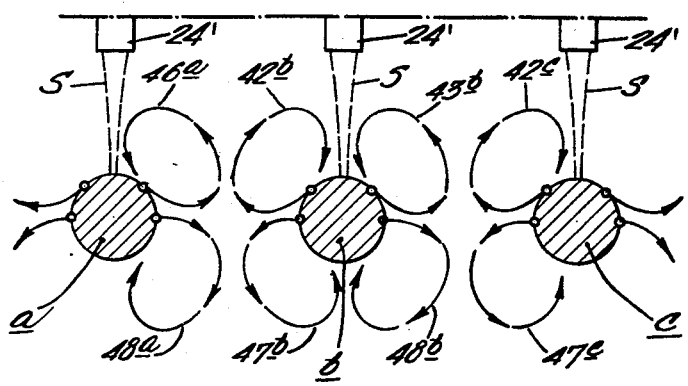

The directions of rotation just referred to are further indicated by arrows for the tornadoes 45a and 46a in connection with the corresponding pair of tornadoes associated with the jet delivered from the orifice a. It will be understood that in the illustration of the jet flow originating from orifice a, the flow has been cut off or sectioned adjacent to the downstream end of the zone of laminar flow 44a, i.e. adjacent to the zone in which the pair of tornadoes have been enlarged and commence the mutual merging which occurs as the jet flow proceeds. With the illustration just referred to, it further clearly appears that the jet flow originating from orifice a not only includes the pair of tornadoes 45a and 46a but also includes another pair of tornadoes 47a and 48a, the directions of rotation of which are also opposite to each other, as shown in FIGS. 13 and 16, but in this case, the tornado 47a at the left, as viewed in FIG. 13, rotates in a counter clockwise direction, whereas the tornado 48a at the right rotates in the clockwise direction. It will be understood that similar duplicate pairs of tornadoes are generated by and associated with each of the jets. The origin of generation of the lower pair is somewhat different than the origin of generation of the upper pair as will be explained hereinafter with more particular reference to FIG. 14.

Still referring to FIG. 13, as the flow proceeds from the plane in which the tornadoes are illustrated for the jet delivered from orifice a, all four of the tornadoes tend to merge and reform a more generalized jet flow and this is indicated in FIG. 13 by a section 49c, representing a downstream section of the jet flow originating from orifice c. As will be seen, the whirling motions of the tornadoes are diminishing in intensity and the entire flow, including the laminar flow of the central zone of the jet, intermix with each other in the region indicated at 49c, and thereafter the jet progresses downwardly toward the blast which is indicated at 18' in FIG. 13 and referred to more fully hereinafter.

In the illustration of FIG. 13 it will be understood that for the sake of clarity, the sharing of the various portions of the jet flow is somewhat schematic. For instance, in a zone spaced somewhat downstream of the points of origin, the pairs of tornadoes originating in one jet appear in the figure as being somewhat separated from the pair of tornadoes originating in adjoining jets, whereas, in fact, the tornadoes of adjoining jets would be substantially contiguous.

Figure 14:
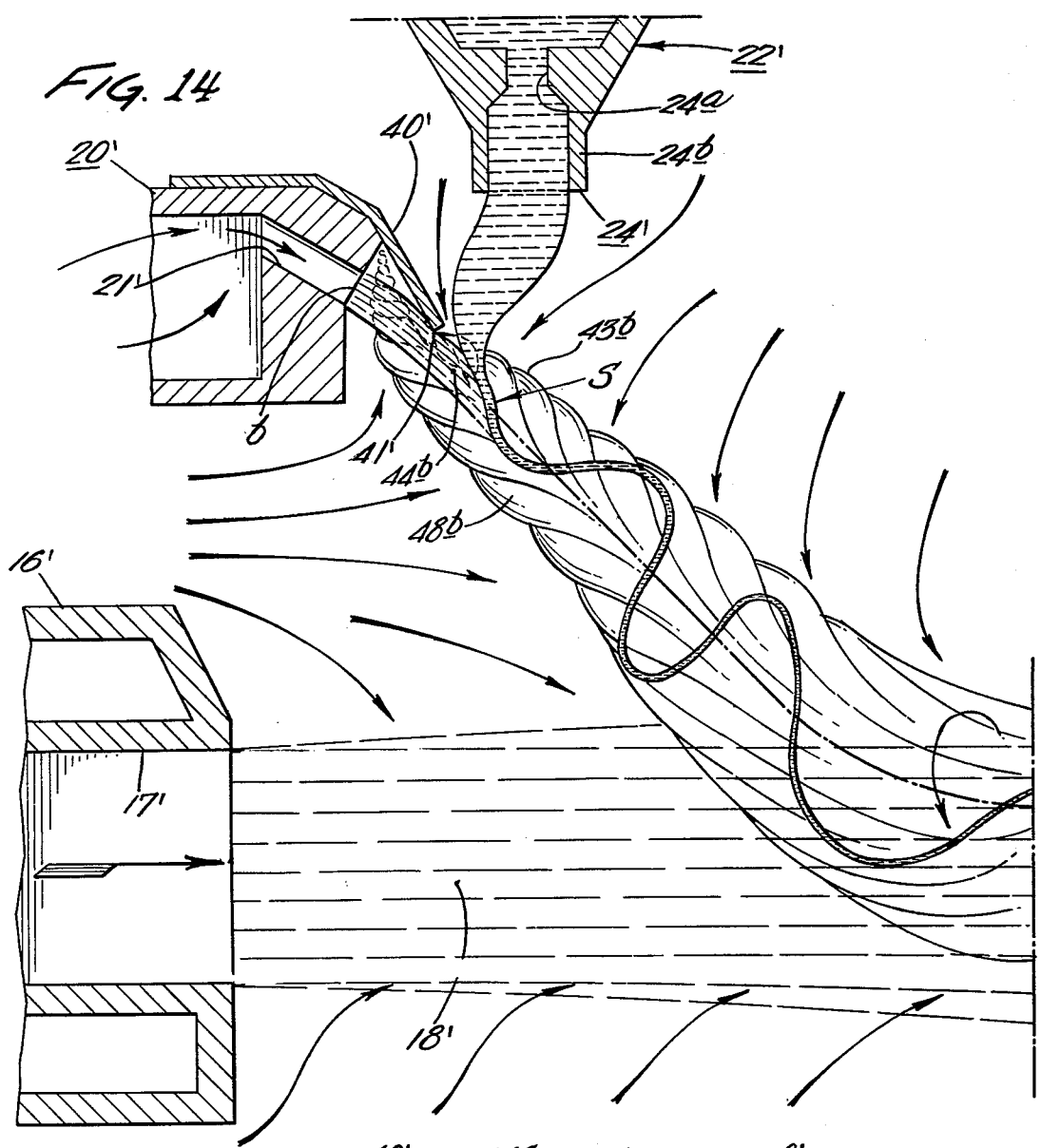
Figure 15:
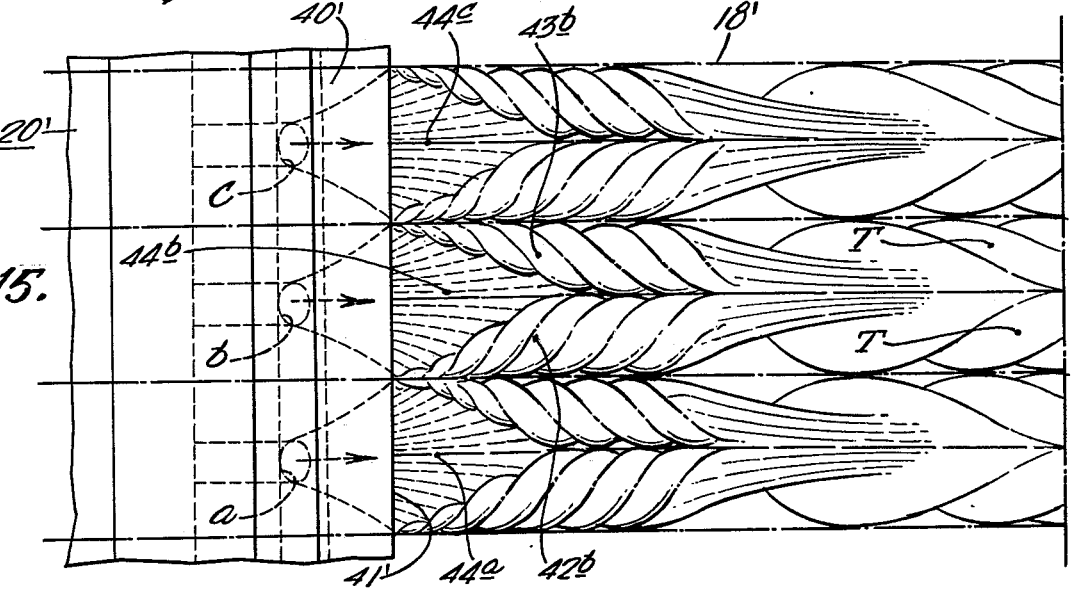

Turning now to the illustration in FIG. 14, it is assumed that the fiberizing center there shown is the center originating at the jet orifice b of FIG. 13. The tornado 43b is also there shown, as is the intervening laminar zone 44b. The lower pair of tornadoes originate in the region within or under the deflector plate 40', FIG. 14 being a sectional view showing only the lower tornado 48b, which originates behind the zone 44b. The direction of rotation of these lower tornadoes originated as a result of the combined action of the jet on the underside of the plate 40', together with induced air currents joining the jet stream, and it is here noted that the currents in the lower pair of tornadoes are of lesser intensity or velocity than the currents in the upper pair. Moreover, the direction of the currents flowing in the tornadoes of the upper pair has a dominate influence upon the action of the system when the stream of attenuable material is introduced first into the laminar zone and then into the jet flow downstream of the point where the tornadoes merge.

Because of the jet flow in the laminar zone and in the pairs of tornadoes, particularly the upper pair of each group, the introduction of the stream of attenuable material, which is indicated in FIG. 13 4 at S for the fiberizing center including the jet orifice b, results in the progression of the stream into the laminar flow of the central zone. This carries the stream into the zone of high velocity lying between the pairs of tornadoes and, in consequence, the stream is attenuated as is shown in FIG. 13. It is found that this attenuation occurs substantially within a planar zone indicated in FIG. 13 at P. The action of the pairs of tornadoes causes a whipping of the attenuated fiber substantially within the planar zone P, so that this attenuation does not result in projection of the fibers being formed laterally toward the adjoining jets.

Further jet flow causes the jet, together with the attenuating fiber carried thereby, to penetrate the upper boundary of the blast 18', the jet flow still retaining sufficient kinetic energy to effect such penetration of the blast, and thereby initiate a second phase of fiberization which proceeds or is effected, in accordance with the principles fully explained above. Indeed, in the region of penetration of the jets into the blast, the flow and velocity of each jet is still sufficiently concentrated near the center of each jet so that each jet acts individually to develop a zone of interaction in the blast. Thus, from FIG. 13 it will be noted that in the zone of interaction, i.e. in the toration zone, a pair of oppositely rotating whirls or tornadoes indicated at TT, are generated, thereby developing the currents which cause further attenuation of the fiber being formed. The fiber is thereafter carried by the combined flow of the jet and blast to a suitable collection means, for instance a travelling perforated conveyor such as indicated diagrammatically at 26' in FIG. 7.

As will be understood, both in the laminar zone adjacent to the edge of the deflector and also as the jet flow progresses downstream, air is induced, and this induction of air is clearly indicated by arrows applied to the jet flow in FIG. 13. Such induction of air currents is also clearly indicated in FIG. 14.

Having in mind the foregoing description of the general nature of the equipment and operation contemplated according to this embodiment of the present invention, attention is now called to certain permissible variations and ranges of operating conditions which may be employed.

First with regard to the relative positioning of the jet orifices and the guiding or deflecting means, such as the guiding plate 40', it is contemplated that the arrangement of the jets and the guiding plate should provide for spreading of the jets so that adjacent jets impinge upon each other substantially at the edge of the guide plates. This is the condition illustrated in FIG. 13 and it will be noted that with this arrangement, the points of origin or the apices of the upper pairs of tornadoes are at the edge 41' of the guide plate 40'.

The jets and the guide plate may be arranged so that the jets impinge upon each other at points somewhat upstream or downstream of the edge of the guide plate, but it is preferred that the impingement of adjacent jets upon each other be maintained quite close to, but not necessarily precisely on, the edge of the plate, because in this condition, maximum stability of the tornadoes is attained, with consequent maximum stability of the intervening laminar zone of the jet. In turn, the stability of the laminar zone is important in the stabilization of the glass feed into the system.

If the point of impingement of adjacent jets is spaced appreciably downstream of the edge of the guide plate, the tornadoes become unstable because their apices originate in free space rather than at the edge of the plate. When the apices of the tornadoes originate in free space, they are subject to fluctuations by stray gas currents and in consequence tend to shift in position; but if the apices originate at or substantially at the edge of the deflector plate they are less sensitive to stray currents and, indeed appear to "attach" themselves to the edge of the plate in a stable position.

On the other hand, if the adjacent jets impinge upon each other at a point spaced appreciably upstream of the edge of the guide plate, the formation of the tornadoes is impaired because the guide plate itself prevents proper formation of the tornadoes.

It is also of importance in providing for generation of the upper pair of tornadoes at the edge 41' of the guide plate, that the edge 41' be located at or approximately at the central axis of the jet. If the edge of the guide plate is raised substantially, the deflection is correspondingly diminished or even eliminated, in which event no tornadoes will be generated. On the other hand, if the edge of the deflector is located excessively low, for instance below the lower boundery of the jet, there is a tendency for the tornadoes to diminish in their organization and provide only for uniform or parallel flow throughout the entire section of the jet, rather than for the desired higher velocity helical or vortical flow of the tornadoes.

The generation of the tornadoes under the most favorable conditions, i.e. under the conditions in which the apices are "attached" to the edge of the deflector, produces the most stable tornadoes and thus also the most stable operating conditions with respect to the feed of the glass stream and its attenuation in the planar zone P above described.

In connection with the advantages of the technique of the present invention, it is to be noted that the technique is capable of producing fibers of a wide range of fiber diameter, even fibers of smaller diameter than those produced by the toration technique of FIGS. 1 to 4 above described. However, of special importance and significance is the fact that the technique of FIGS. 7 to 17B is capable of producing fibers of a given diameter at a substantially higher "pull rate" than is possible with the toration technique of FIGS. 1 to 4. The pull rate here referred to is the rate at which the fiber may be formed from a given orifice or supply means for the attenuable material. In accordance with the technique of FIGS. 7 to 17B, the pull rate may even be as high as 150 kg/hole per 24 hours. This and other operational factors will be referred to again hereinafter with particular reference to FIGS. 17, 17A and 17B and the related tabulated information given in the specification herebelow.

As above indicated, the first phase or stage of the attenuation may if desired be employed independently of the second or toration stage, and this first stage, although not capable of producing fibers as fine as those produced when both stages are used, does produce fibers that are fine enough for certain uses and are capable of being produced at a relatively high pull rate.

Figure 17:
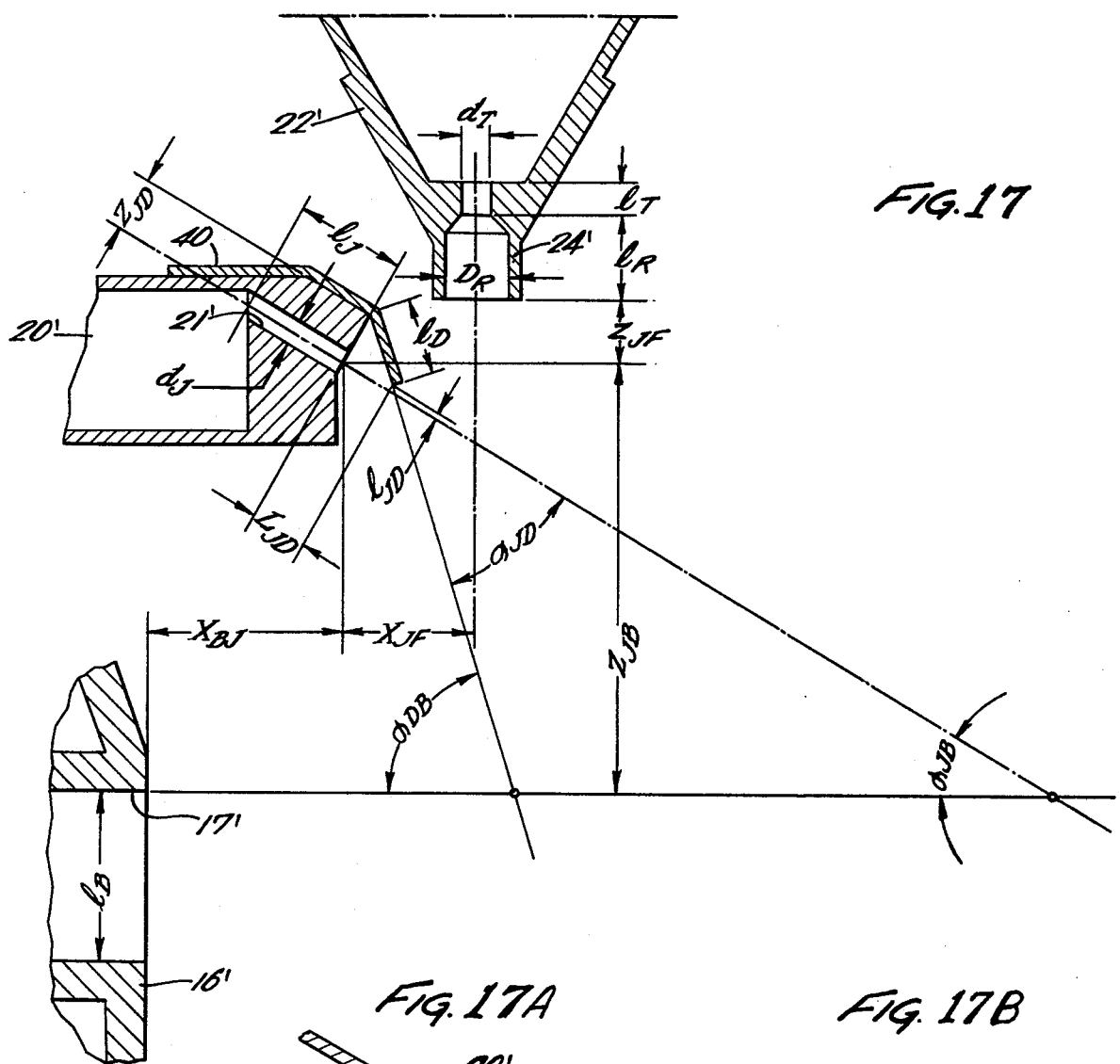
Figure 17A:
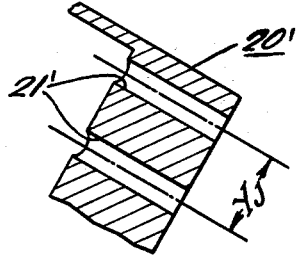
FIG 17A is a fragmentary sectional view showing the spacing between a pair of adjacent jet orifices.
Figure 17B:
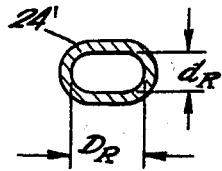

Turning now to FIGS. 17, 17A and 17B and also to the information tabulated herebelow, it is first pointed out that the representation of the various components of the system, particularly in FIG. 17, is given in a manner to facilitate explanation of the ranges of dimensions and angles, and does not necessarily illustrate the preferred values in all of the ranges.

FIG. 17 illustrates the three major components, i.e. the means for developing the blast, the means for developing the jet, and the means for introducing the attenuable material, each of these three means being shown in section in the same general manner as in FIGS. 8 and 14, but in FIG. 17 symbols or legends have been applied to identify certain dimensions and angles, all of which are referred to in one or another of the tabulations herebelow. Some of these symbols or legends appear in FIGS. 17A and 17B.

First, with reference to the bushing 22' for the supply of the attenuable material, see the following table:

TABLE 1

| Symbol | (mm) Preferred Value | Range |
| --- | --- | --- |
| $d_T$ | 2 | 1 → 5 |
| $l_T$ | 1 | 1 → 5 |
| $l_R$ | 5 | 0 → 10 |
| $d_R$ | 2 | 1 → 5 |
| $D_r$ | 5 | 1 → 10 |

With reference to the jet supply and the deflector, see the following table:

TABLE 2

| Symbol | Preferred Value (mm, degree) | Range |
| --- | --- | --- |
| $d_J$ | 2 | 0.5→4 |
| $l_J$ | 7 | 1→ |
| $Y_J$ | Close to lower end of range | about 3→ about 4 |
| $l_D$ | 4 | 2→10 |
| $\dfrac{l_{JD}}{d_J}$ | 0 | −0.06→+1 |
| $\alpha JD$ | 45 | 35→55 |
| $\alpha JB$ | 10 | 0→45 |
| $Z_{JD}$ | 3 | 2→5 |
| $L_{JD}$ | 3 | 2→5 |

In connection with the values indicated for $l_{JD}$ it is pointed out that zero value represents the position of the deflector in which the lowermost portion of the free edge of the deflector lies on the axes of the jets, a negative value for $l_{JD}$ representing a position of the deflector above the jet axes.

In connection with the angle identified above as $\alpha JD$, it is to be noted that downstream of the edge of the deflector, the jet spreads or enlarges, as will be evident from FIGS. 7, 8 and 14. However, the angle of this spreading is not the same as the angle represented by the symbol $\alpha JD$, because the deflector causes the jet to alter its path and also influences the extent to which the jet spreads.

With regard to the blast, note the following table:

TABLE 3

| Symbol | Preferred Value (mm) | Range |
| --- | --- | --- |
| $l_B$ | 10 | 5→20 |

In addition to the foregoing dimensions and angles involved in the three major components of the system, certain interrelationships of those components are also to be noted, being given in the table just below.

TABLE 4

| Symbol | Preferred Value (mm, degree) | Range |
| --- | --- | --- |
| $Z_{JF}$ | 8 | 3→15 |
| $Z_{JB}$ | 17 | 6→30 |
| $X_{BJ}$ | −5 | −12→+13 |
| $X_{JF}$ | 5 | 3→8 |
| $\alpha_{DB}$ | 45 | 35→55 |

In connection with the symbol $X_{BJ}$, it will be noted that in the illustration of FIG. 17, $X_{BJ}$ is indicated at a negative value, i.e. with the blast nozzle in a position (in relation to the direction of flow of the blast) which is upstream of the position of the jet.

As indicated hereinabove, it is contemplated according to FIGS. 7 to 17B that the carrier or secondary jets be placed sufficiently close to each other so that they impinge upon each other in order to develop the pairs of tornadoes in each carrier jet. Any convenient number of fiberizing centers may be established, each center comprising a delivery device for the attenuable material and an associated jet, and since each carrier jet must impinge upon another jet at each side thereof, it will be seen that the number of jets must include two more than the total number of delivery means for the attenuable material, the two "extra" jets being positioned at the opposite ends of the series of jets.

The number of fiberizing centers may run up to as many as 150, but in a typical installation where glass or some similar thermoplastic material is being fiberized, a bushing having 70 delivery devices or orifices is appropriate. In such a case, there would necessarily be 72 jets.

In connection with the operating conditions, it is first pointed out that the conditions of operating the system will vary in accordance with a number of factors, for example in accordance with the characteristics of the material being attenuated.

As above indicated, the system of the present invention is capable of use in the attenuation of a wide range of attenuable materials. In the attenuation of glass or other inorganic thermoplastic materials, the temperature of the bushing or supply means will of course vary according to the particular material being fiberized. The temperature range for materials of this general type may fall between about 1400° and 1800° C. With a typical glass composition, the bushing temperature may approximate 1480° C.

The pull rate may run from about 20 to 150 kg/hole per 24 hours, typical values being from about 50 to about 80 kg/hole per 24 hours.

Certain values with respect to the jet and blast are also of significance, as indicated in tables just below in which the following symbols are used.

T = Temperature
p = Pressure
V = Velocity
$\rho$ = Density

TABLE 5

JET SUPPLY

| Symbol | Preferred Value | Range |
| --- | --- | --- |
| $p_J$ (bar) | 2.5 | 1→4 |
| $T_J$ (° C) | 20 | →1500 |
| $V_J$ (m/s) | 330 | 200→900 |
| $(\rho V^2_J)$ (bar) | 2.1 | 0.8→3.5 |

TABLE 6

BLAST

| Symbol | Preferred Value | Range |
| --- | --- | --- |
| pB (mbar) | 95 | 30→250 |
| $T_B$ (° C) | 1450 | 1350→1800 |
| $V_B$ (m/s) | 320 | 200→550 |
| $(\rho V^2_B)$ (bar) | 0.2 | 0.06→0.5 |

With regard to the jet and blast, it should be kept in mind that it is contemplated according to the present invention that the deflected jet may be utilized alone for attenuation of certain materials, without the employment of the blast in combination with the jet. It is also to be kept in mind that where both the jet and blast are employed, it is contemplated that the jet shall have a cross section smaller than that of the blast and shall penetrate the blast in order to develop a zone of interaction in which the secondary or toration phase of the attenuation will be effected. For this purpose, the jet must have greater kinetic energy than the blast, per unit of volume of the jet and blast in the operational area thereof. The jet may have kinetic energy of from 1.60 to 60 times that of the blast, a typical ratio being 10 to 1. Thus, in terms of the kinetic energy values given in Tables 5 and 6 above: $(\rho V^2)J/(\rho V^2)B = 10$

EXAMPLE

In equipment of the kind illustrated in FIGS. 7 to 12 and having 70 fiberizing centers, a glass of the following composition was attenuated.

|  | (Parts by Weight) |
|---|---|
| $SiO_2$ | 63.00% |
| $Fe_2O_3$ | 0.30 |
| $Al_2O_3$ | 2.95 |
| $CaO$ | 7.35 |
| $MgO$ | 3.10 |
| $Na_2O$ | 14.10 |
| $K_2O$ | 0.80 |
| $B_2O_3$ | 5.90 |
| $BaO$ | 2.50 |

The bushing temperature was about 1500° C and the jet and blast temperatures were respectively about 20° C and 1500° C. The ratio of the kinetic energy of the jet to the blast was about 10 to 1. The pull rate was 55 kg/hole per 24 hours.

The fiber diameter after both stages of attenuation averaged about 6 microns.

We claim:

1. A method for forming fibers from attenuable material comprising establishing a gaseous blast, establishing a series of spaced side by side gaseous jets each of smaller cross section than the blast and directed in paths having a predetermined relation to the path of the blast, deflecting the flow of the jets to alter the paths of the jets from said predetermined paths into paths intersecting the path of the blast and to cause lateral spreading of the jets, the jets being sufficiently close to each other to provide for impingement of adjacent deflected jets upon each other in zones intermediate said predetermined paths and thereby generate spaced tornadoes and the jets having sufficient kinetic energy per unit of volume to cause the deflected jets to penetrate the blast, and delivering a stream of attenuable material into the influence of each jet in a region along the path thereof between said tornadoes.

2. A method as defined in claim 1 in which the jets are established in generally parallel relationship to the blast and from which the jets are deflected toward the path of blast.

3. A method as defined in claim 1 in which the blast is established in a generally horizontal path, in which the jets are established in paths above the blast, in which the jets are deflected downwardly into the blast at an angle oblique to the vertical, and in which the streams of attenuable material are delivered vertically downwardly into the influence of the jets.

4. A method for forming fibers from attenuable material comprising establishing a series of spaced gaseous jets directed in side by side paths, deflecting the jets from said paths to alter the paths thereof and to cause lateral spreading of the jets, the jets being sufficiently close to each other to provide for impingement of adjoining deflected jets upon each other in zones intermediate the jets and thereby generate spaced tornadoes, and delivering a stream of attenuable material into the influence of each jet in a region along the path thereof between said tornadoes.

5. A method as defined in claim 4 in which the paths of the jets as deflected extend at an oblique angle to the vertical, and in which the streams of attenuable material are delivered downwardly by gravity into the influence of the jets.

6. In the toration of fibers from attenuable material, the method of developing the secondary or carrier jet and of delivering the attenuable material into the zone of interaction of the secondary jet with the toration blast, which method comprises establishing a series of spaced side by side gaseous jets, subjecting the jets to deflection and thereby cause lateral spreading of the jets, the jets being sufficiently close to each other to provide for impingement of adjoining deflected jets upon each other in zones intermediate the jets and thereby generate spaced tornadoes at opposite sides of at least one of said jets, the deflected flow of said one jet including said tornadoes being directed in a path intersecting the path of the toration blast and having sufficient kinetic energy to penetrate the blast and thereby serve as a secondary or carrier jet for the purpose of fiber toration, and delivering a stream of the attenuable material into the influence of said one jet in a region between said tornadoes.

7. A method as defined in claim 6 in which the deflection of the jets is effected in a zone spaced appreciably from the boundary of the blast and in which the delivery of the stream of molten material to the jet is effected in a zone close to the zone of deflection and thereby provide for preliminary attenuation of the stream in the region of said tornadoes prior to toration of the fiber being formed in the zone of interaction between the secondary jet and the blast.

8. A method for converting molten glass into glass fibers comprising delivering a stream of the molten glass downwardly from a supply orifice, establishing a gaseous blast spaced below the glass supply orifice, developing a gaseous jet of smaller cross section and greater kinetic energy per unit of volume than that of the blast directed in a path toward the glass stream between the glass supply orifice and the blast, and deflecting the jet from said path into a path extended downwardly toward the blast by interposing a deflector element between the jet and the glass stream, the glass stream being delivered to the deflected jet.

9. A method for forming fibers from attenuable material, comprising generating a gaseous jet having a substantially laminar flow central portion and having at opposite sides a pair of tornadoes of diameter progressively increasing and ultimately merging downstream of the portion of laminar flow, and delivering a stream of attenuable material to the portion of laminar flow between said tornadoes upstream of the region of merging.

10. A method for forming fibers from attenuable material, comprising generating a gaseous jet having a substantially laminar flow central portion and having at opposite sides a pair of tornadoes of diameter progressively increasing and ultimately merging downstream of the portion of laminar flow, generating a gaseous blast in a path intercepting the jet downstream of the region of merging of the tornadoes, the cross section of the merged jet flow being smaller than that of the blast and the merged jet flow being of greater kinetic energy than the blast so that the jet penetrates the blast and produces a zone of interaction of the jet and blast, and delivering a stream of attenuable material to the portion of laminar flow between said tornadoes upstream of the region of merging, thereby providing preliminary attenuation in the jet flow and further providing additional attenuation in said zone of interaction by toration.

11. A method for forming fibers from attenuable material, comprising generating a gaseous jet having a substantially laminar flow central portion and having at opposite sides a pair of tornadoes of diameter progressively increasing and ultimately merging downstream of the portion of laminar flow, and delivering a stream of attenuable material to the portion of laminar flow between said tornadoes upstream of the region of merging, the laminar portion of the jet having a horizontal component of travel, the stream of material being delivered downwardly to the portion of laminar flow, and the tornadoes of said pair having opposite helical motion with downward components at the adjacent sides thereof and with axial components in a direction downstream of the laminar flow of said portion.

12. A method for forming fibers from attenuable material, comprising generating a gaseous jet having a substantially laminar flow portion and having at opposite sides a pair of tornadoes of diameter progressively increasing and ultimately merging downstream of the portion of laminar flow, and delivering a stream of attenuable material to the portion of laminar flow at one side thereof between said tornadoes upstream of the region of merging, the tornadoes of said pair having opposite helical motion, with converging components of motion at the sides of the jet to which the stream of material is delivered.

13. A method for forming fibers from attenuable material, comprising generating a gaseous jet having a substantially laminar flow central portion and having at opposite sides a pair of tornadoes of diameter progressively increasing and ultimately merging downstream of the portion of laminar flow, generating a gaseous blast in a path intercepting the jet downstream of the region of merging of the tornadoes, the cross section of the merged jet flow being smaller than that of the blast and the merged jet flow being of greater kinetic energy per unit of volume than the blast so that the jet penetrates the blast and produces a zone of interaction of the jet and blast, and delivering a stream of attenuable material to the jet at one side thereof between said tornadoes upstream of the region of merging of the tornadoes, tornadoes of said pair having opposite helical motion with converging components of motion at the side of the jet to which the stream of material is delivered, thereby providing preliminary attenuation in the jet flow and further providing additional attenuation in said zone of interaction by toration.

14. A method for forming fibers from attenuable material, comprising generating a gaseous flow having portions of different flow characteristics in different portions thereof including a portion of substantially laminar flow with a pair of tornadoes at opposite sides of the portion of laminar flow, which tornadoes progressively increase in diameter and which ultimately merge downstream of the laminar portion, and delivering a stream of attenuable material to the laminar portion between said tornadoes upstream of the region of merging.

15. A method for forming fibers from attenuable material, comprising generating a gaseous flow having portions of different flow characteristics in different portions thereof including a portion of substantially laminar flow with a pair of tornadoes at opposite sides thereof, which tornadoes progressively increase in diameter and which ultimately merge downstream of the laminar portion, and delivering a stream of attenuable material to the laminar portion at one side thereof between said tornadoes upstream of the region of merging, the tornadoes of said pair having opposite helical motion, with converging components of motion at that side of the laminar portion to which the stream of material is delivered.

16. A process for forming fibers from attenuable material characterized by generating a gaseous flow having portions of different flow characteristics in different portions thereof including pairs of side by side spaced tornadoes with a zone of laminar flow between the tornadoes of each pair, and delivering a stream of attenuable material to one side of each zone of laminar flow, the tornadoes of each pair having opposite helical motion, with converging components of motion at that side of the zone of laminar flow to which the stream of attenuable material is delivered.

17. Apparatus for forming fibers from attenuable material comprising means for establishing a gaseous blast, means for establishing a series of spaced side by side jets each of smaller cross section than the blast and directed in paths having a predetermined initial relation to the path of the blast, means for deflecting the flow of the jets to alter the paths of the jets from said predetermined paths into paths intersecting the path of the blast and to cause lateral spreading of the jets, the jets being sufficiently close to each other to provide for impingement of adjoining deflected jets upon each other in zones intermediate said predetermined paths and thereby generate spaced tornadoes and the jets having sufficient kinetic energy per unit of volume to cause the deflected jets to penetrate the blast, and means for delivering a stream of attenuable material into the influence of each jet in a region along the path thereof between said tornadoes.

18. Apparatus as defined in claim 17 in which the means for deflecting the jets comprises a deflector plate presenting a deflecting surface at an oblique angle to the initial path of a plurality of the jets.

19. Apparatus as defined in claim 18 in which the free edge of the deflector plate lies along a line in the region of the axes of the jets.

20. Apparatus as defined in claim 19 in which the free edge of the deflector is located from about 2 mm to about 5 mm from the jet orifices.

21. Apparatus as defined in claim 18 in which the deflecting surface of the deflector plate is positioned at an angle of from about 35° to about 55° with respect to the axes of the jets.

22. Apparatus for forming fibers from attenuable material comprising means for establishing a series of spaced gaseous jets directed in side by side generally parallel paths, means for deflecting the jets from said paths to alter the paths thereof and to cause lateral spreading of the jets, the jets being sufficiently close to provide for impingement of adjoining deflected jets upon each other in zones intermediate the jets and thereby generate spaced tornadoes, and means for delivering a stream of attenuable material into the influence of each jet in a region along the path thereof between said tornadoes.

23. Apparatus as defined in claim 22 in which the means for deflecting the jets comprises a deflector plate presenting a deflecting surface at an oblique angle to the initial path of a plurality of the jets.

24. Apparatus as defined in claim 23 in which an edge of the deflector plate lies along a line in the region of the axes of the jets.

25. Apparatus as defined in claim 24 in which the free edge of the deflector is located from about 2 mm to about 5 mm from the jet orifices.

26. Apparatus as defined in claim 23 in which the deflecting surface of the deflector plate is positioned at an angle of from about 35° to about 55° with respect to the axes of the jets.

27. Equipment for making fibers from attenuable material comprising supply means for the attenuable material having a delivery orifice positioned for downward delivery of a stream of the material, means for establishing a gaseous blast below the supply means, means for establishing a gaseous jet including an orifice discharging a jet of smaller cross section than that of the blast, and means for deflecting the path of the jet into a path intersecting the path of the blast, the delivery orifice for the attenuable material being positioned to deliver said stream to the jet in said deflected path, the deflected jet being of sufficient velocity to penetrate the blast and develop a zone of interaction of the jet and blast in the vicinity of the penetration of the jet.

28. Equipment as defined in claim 27 in which the axis of the jet is initially directed in the same general direction as the blast.

29. Equipment for making fibers from attenuable material comprising supply means for the attenuable material having a delivery orifice positioned for downward delivery of a stream of the material, means for establishing a gaseous blast in a position spaced below the supply means, means for establishing a gaseous jet including an orifice discharging a jet of smaller cross section than that of the blast, and jet guiding means comprising a guide element positioned to guide the jet in a path from which the jet approaches and penetrates the blast through the boundary thereof presented toward the stream delivery orifice and thereby develop a zone of interaction of the jet with the blast, said delivery orifice being positioned with relation to the jet and blast to deliver the stream of attenuable material to the influence of the guided jet and thence into said zone of interaction.

30. Equipment as defined in claim 29 in which the jet orifice is positioned to discharge the jet in a direction transverse to and toward the stream of attenuable material and further in which the guide element has an edge interposed in the path of the jet between the jet orifice and the stream of attenuable material delivered from said stream delivery orifice.

31. Equipment for making glass fibers from molten glass comprising glass supply means having a delivery orifice positioned for downward delivery of a stream of molten glass, means for establishing a gaseous blast spaced below the glass delivery orifice, means for establishing a gaseous jet including an orifice discharging a jet of smaller cross section than that of the blast, and jet guiding means comprising a guide element positioned to guide the jet in at least a portion of a path between the jet orifice and the boundary of the blast presented toward the glass delivery orifice, the jet having kinetic energy per unit of volume higher than the blast and penetrating the blast to develop a zone of interaction of the jet with the blast, and the glass delivery orifice being positioned with relation to the jet and the blast so that the stream of molten glass is introduced into the influence of the guided jet and thence into said zone of interaction.

32. Equipment as defined in claim 31 in which the glass orifice is located in a position which, with respect to the direction of flow of the blast, is downstream of the jet orifice.

33. Equipment as defined in claim 31 in which the jet orifice is positioned to discharge the jet in a direction transverse to and toward the stream of glass and further in which the guide element is interposed in part in the path of the jet between the jet orifice and the stream of glass delivered from the glass delivery orifice.

34. Equipment for making glass fibers from molten glass comprising glass supply means having delivery orifices positioned for downward delivery of streams of molten glass, means for establishing a gaseous blast spaced below the glass delivery orifices, means for establishing a plurality of gaseous jets including orifices discharging jets of smaller cross section than that of the blast, and jet guiding means comprising a guide element interposed in part in the path of the jet and positioned to guide the jets in at least a portion of the path thereof between the jet orifices and the boundary of the blast presented toward the glass delivery orifices, the jets being of higher velocity than the blast and penetrating the blast to develop zones of interaction of the jets with the blast, the jets being positioned close to each other to provide for interaction thereof in their guided paths, and the glass delivery orifices being positioned with relation to the jets and the blast so that the streams of molten glass are introduced into the influence of the guided jets and thence said zones of interaction.

35. Apparatus for forming fibers from attenuable thermoplastic material comprising means for establishing a gaseous blast, a series of spaced orifices for directing gaseous jets in side by side generally parallel paths and penetrating the blast to develop zones of interaction between the jets and the blast, means for delivering streams of molten attenuable material into the influence of said zones of interaction including a supply bushing having a series of delivery orifices for the molten material, gas supply means for the jet orifices comprising separate manifold boxes for different groups of the jet orifices, and means for mounting the manifold boxes for separate adjustment movement with respect to the streams of the molten attenuable material.

36. Apparatus as defined in claim 35 in which the means for mounting the manifold boxes comprises mechanism for adjusting the relative positions of the boxes in a direction transversely of the blast.

37. Apparatus for forming fibers from attenuable material comprising means for establishing a series of spaced gaseous jets in side by side generally parallel paths, means in the paths of the jets for causing the jets to spread laterally, the jets being sufficiently close to provide for impingement of adjoining jets upon each other in zones intermediate the jets and thereby generate spaced tornadoes, and means for delivering a stream of attenuable material into the influence of each jet in a region along the path thereof between said tornadoes.

38. Apparatus for forming fibers from attenuable material comprising means for generating a gaseous flow, means for establishing a pair of spaced tornadoes and an intermediate laminar flow area in said gaseous flow with the laminar flow area exposed at one side of the gaseous flow and with the tornadoes increasing in diameter and ultimately merging downstream of the laminar area, and means for delivering a stream of attenuable material into the influence of the gaseous flow in a region along the path thereof in said exposed laminar flow area between said tornadoes.

39. Apparatus as defined in claim 38 and further including means for generating a gaseous blast of larger cross section than said gaseous flow, the blast being directed in a path intercepting the path of said gaseous flow.

40. A method for forming fibers from attenuable material comprising generating a gaseous flow, establishing a pair of spaced tornadoes and an intermediate laminar flow area in said gaseous flow with the laminar flow area exposed at one side of the gaseous flow and with the tornadoes increasing in diameter and ultimately merging downstream of the laminar area, and delivering a stream of attenuable material into the influence of the gaseous flow in a region along the path thereof in said exposed laminar flow area between said tornadoes.

41. A method as defined in claim 40 and further including directing a gaseous blast of larger cross section than said gaseous flow in a path intercepting said gaseous flow, the gaseous flow having greater kinetic energy per unit of volume than the blast so that the gaseous flow penetrates into the blast.

42. A method as defined in claim 1 in which the flow of the jets is deflected by positioning a deflector plate in the path of the jets, the temperature of the jets approximating ambient temperature.

* * * * *